(12) United States Patent
Pycko et al.

(10) Patent No.: US 9,883,036 B1
(45) Date of Patent: Jan. 30, 2018

(54) USING A SPEECH ANALYTICS SYSTEM TO CONTROL WHISPER AUDIO

(71) Applicant: Noble Systems Corporation, Atlanta, GA (US)

(72) Inventors: Marcin Pycko, Dallas, TX (US); Karl H. Koster, Sandy Springs, GA (US)

(73) Assignee: NOBLE SYSTEMS CORPORATION, Atlanta, GA (US)

( * ) Notice: Subject to any disclaimer, the term of this patent is extended or adjusted under 35 U.S.C. 154(b) by 0 days.

(21) Appl. No.: 15/486,456

(22) Filed: Apr. 13, 2017

Related U.S. Application Data

(60) Division of application No. 14/183,083, filed on Feb. 18, 2014, now Pat. No. 9,674,357, which is a continuation-in-part of application No. 13/949,467, filed on Jul. 24, 2013, now Pat. No. 9,225,833, and a continuation-in-part of application No. 14/073,083, filed on Nov. 6, 2013, now Pat. No. 9,456,083, and a continuation-in-part of application No. 14/080,912, filed on Nov. 15, 2013.

(51) Int. Cl.
*H04M 3/00* (2006.01)
*H04M 5/00* (2006.01)
*H04M 3/51* (2006.01)
*G10L 15/08* (2006.01)
*G10L 13/08* (2013.01)

(52) U.S. Cl.
CPC .......... *H04M 3/5175* (2013.01); *G10L 13/08* (2013.01); *G10L 15/08* (2013.01); *G10L 2015/088* (2013.01); *H04M 2201/40* (2013.01); *H04M 2203/306* (2013.01); *H04M 2203/552* (2013.01)

(58) Field of Classification Search
CPC ............ H04M 3/5183; H04M 3/5166; H04M 3/5233; H04M 2203/556
See application file for complete search history.

(56) References Cited

U.S. PATENT DOCUMENTS

| | | | |
|---|---|---|---|
| 5,267,305 A | 11/1993 | Prohs et al. | |
| 5,270,920 A | 12/1993 | Pearse et al. | |
| 6,157,808 A | 12/2000 | Hollingsworth et al. | |
| 6,356,634 B1 | 3/2002 | Noble, Jr. | |
| 6,721,416 B1 | 4/2004 | Farrell | |
| 6,862,343 B1 | 3/2005 | Vacek et al. | |
| 7,133,828 B2 | 11/2006 | Scarano et al. | |

(Continued)

OTHER PUBLICATIONS

U.S. Appl. No. 61/753,641, filed Dec. 31, 1899, Watson et al.
Notice of Allowance Received for U.S. Appl. No. 15/051,930 dated Jul. 12, 2017.

*Primary Examiner* — Nafiz E Hoque

(57) ABSTRACT

A speech analytics system monitors speech from a remote party and/or agent to determine when a whisper is to be provided to the agent. A whisper is aural information that may assist the agent at certain opportune times. The whisper may be verbal or non-verbal in nature. A whisper bridge is used that allows the whisper to be heard by the agent, but not by the remote party. In one embodiment, the speech analytics system may cause visual-based agent information to be provided to the computer used by the agent, and monitor the agent's speech to ascertain if an expected speech response to the whisper was provided by the agent. If not, the speech analytics system may cause the whisper to be provided to the agent, as a form of reminder.

16 Claims, 12 Drawing Sheets

(56) References Cited

U.S. PATENT DOCUMENTS

| | | |
|---|---|---|
| 7,542,902 B2 | 6/2009 | Scahill et al. |
| 7,548,539 B2 | 6/2009 | Kouretas et al. |
| 7,574,000 B2 | 8/2009 | Blair |
| 7,672,845 B2 | 3/2010 | Beranek et al. |
| 7,752,043 B2 | 7/2010 | Watson |
| 7,930,179 B1 | 4/2011 | Gorin et al. |
| 7,974,411 B2 | 7/2011 | Krishnapuram et al. |
| 8,078,470 B2 | 12/2011 | Levanon |
| 8,094,790 B2 | 1/2012 | Conway et al. |
| 8,094,803 B2 | 1/2012 | Danson et al. |
| 8,155,297 B1 | 4/2012 | Dhir et al. |
| 8,175,007 B2 | 5/2012 | Jain et al. |
| 8,180,643 B1 | 5/2012 | Pettay et al. |
| 8,204,180 B1 | 6/2012 | Narayanan et al. |
| 8,209,182 B2 | 6/2012 | Narayanan |
| 8,219,401 B1 | 7/2012 | Pettay et al. |
| 8,249,875 B2 | 8/2012 | Levanon et al. |
| 8,275,115 B1 | 9/2012 | Everingham et al. |
| 8,396,205 B1 | 3/2013 | Lowry et al. |
| 8,396,732 B1 | 3/2013 | Nies et al. |
| 8,401,155 B1 | 3/2013 | Barnes et al. |
| 8,422,641 B2 | 4/2013 | Martin, II |
| 8,463,606 B2 | 6/2013 | Scott et al. |
| 8,504,371 B1 | 8/2013 | Vacek et al. |
| 8,531,501 B2 | 9/2013 | Portman et al. |
| 8,649,499 B1 | 2/2014 | Koster et al. |
| 8,761,376 B2 | 6/2014 | Pande et al. |
| 8,767,948 B1 | 7/2014 | Riahi et al. |
| 8,781,092 B2 | 7/2014 | Noble, Jr. |
| 8,949,128 B2 | 2/2015 | Meyer et al. |
| 9,014,364 B1 | 4/2015 | Koster et al. |
| 2003/0002651 A1 | 1/2003 | Shires |
| 2003/0154120 A1 | 8/2003 | Freishtat et al. |
| 2004/0008828 A1 | 1/2004 | Coles et al. |
| 2004/0249650 A1 | 12/2004 | Freedman et al. |
| 2005/0238161 A1 | 10/2005 | Yacoub et al. |
| 2005/0283475 A1 | 12/2005 | Beranek et al. |
| 2005/0286705 A1 | 12/2005 | Contolini et al. |
| 2005/0286706 A1 | 12/2005 | Fuller |
| 2006/0050658 A1 | 3/2006 | Shaffer et al. |
| 2006/0111953 A1 | 5/2006 | Setya |
| 2006/0182260 A1* | 8/2006 | McGraw ............ A61K 38/40 379/265.02 |
| 2006/0233346 A1 | 10/2006 | McIlwaine et al. |
| 2006/0256954 A1 | 11/2006 | Patel et al. |
| 2006/0259473 A1 | 11/2006 | Li et al. |
| 2006/0262919 A1 | 11/2006 | Danson et al. |
| 2006/0265090 A1 | 11/2006 | Conway et al. |
| 2007/0011337 A1* | 1/2007 | Brown ............... G06Q 30/02 709/227 |
| 2007/0088563 A1 | 4/2007 | Nardotti, Jr. et al. |
| 2007/0111180 A1 | 5/2007 | Sperle et al. |
| 2007/0160054 A1 | 7/2007 | Shaffer et al. |
| 2007/0198330 A1 | 8/2007 | Korenblit et al. |
| 2007/0280211 A1 | 12/2007 | Malueg et al. |
| 2007/0280460 A1 | 12/2007 | Harris et al. |
| 2008/0002823 A1 | 1/2008 | Fama et al. |
| 2008/0027785 A1 | 1/2008 | Mechaley et al. |
| 2008/0037719 A1 | 2/2008 | Doren |
| 2008/0082330 A1 | 4/2008 | Blair |
| 2008/0240376 A1 | 10/2008 | Conway et al. |
| 2008/0270123 A1 | 10/2008 | Levanon et al. |
| 2009/0157449 A1 | 6/2009 | Itani et al. |
| 2009/0295536 A1 | 12/2009 | Doren |
| 2010/0036670 A1 | 2/2010 | Hill et al. |
| 2010/0082342 A1 | 4/2010 | Erhart et al. |
| 2010/0104086 A1 | 4/2010 | Park |
| 2010/0138411 A1 | 6/2010 | Judy et al. |
| 2010/0158237 A1 | 6/2010 | McCormack et al. |
| 2010/0161990 A1 | 6/2010 | Statham et al. |
| 2011/0010173 A1 | 1/2011 | Scott et al. |
| 2011/0026688 A1 | 2/2011 | Simpson |
| 2011/0033036 A1* | 2/2011 | Edwards ............. G06Q 30/02 379/265.09 |
| 2011/0125499 A1 | 5/2011 | Griggs et al. |
| 2011/0145093 A1 | 6/2011 | Paradise et al. |
| 2011/0202344 A1 | 8/2011 | Meyer et al. |
| 2011/0218798 A1 | 9/2011 | Gavalda |
| 2011/0228919 A1 | 9/2011 | Tew et al. |
| 2011/0307258 A1 | 12/2011 | Liberman et al. |
| 2011/0317828 A1 | 12/2011 | Corfield |
| 2012/0045043 A1 | 2/2012 | Timpson |
| 2012/0140911 A1 | 6/2012 | Johansen et al. |
| 2012/0263285 A1 | 10/2012 | Rajakumar et al. |
| 2013/0003943 A1 | 1/2013 | Munns et al. |
| 2013/0129069 A1 | 5/2013 | Peterson |
| 2013/0246053 A1 | 9/2013 | Scott et al. |
| 2014/0100848 A1 | 4/2014 | Shaffer et al. |
| 2014/0140496 A1 | 5/2014 | Ripa et al. |
| 2014/0140497 A1 | 5/2014 | Ripa et al. |
| 2014/0163960 A1 | 6/2014 | Dimitriadis et al. |
| 2014/0241519 A1 | 8/2014 | Watson et al. |
| 2014/0257820 A1 | 9/2014 | Laperdon et al. |
| 2014/0379525 A1 | 12/2014 | Timem et al. |
| 2015/0106091 A1 | 4/2015 | Wetjen et al. |
| 2015/0281445 A1 | 10/2015 | Kumar et al. |
| 2015/0281446 A1 | 10/2015 | Milstein et al. |

* cited by examiner

USING A SPEECH ANALYTICS SYSTEM TO CONTROL WHISPER AUDIO

CROSS REFERENCE TO RELATED PATENT APPLICATIONS

This application is a divisional of U.S. patent application Ser. No. 14/183,083, entitled Using a Speech Analytics System to Control Whisper Audio, filed on Feb. 18, 2014, a continuation-in-part of U.S. patent application Ser. No. 14/080,912, entitled "Architecture for Processing Real Time Event Notifications From A Speech Analytics System," filed on Nov. 15, 2013, a continuation-in-part of U.S. Pat. No. 9,456,083 entitled "Configuring Contact Center Components for Real Time Speech Analytics," filed on Nov. 6, 2013, and a continuation-in-part of U.S. Pat. No. 9,225,833 entitled "Management System for Using Speech Analytics to Enhance Contact Center Agent Conformance," filed on Jul. 24, 2013, the contents of all of which are incorporated by reference for all that they teach.

BACKGROUND

Agents in contact centers frequently handle calls addressing a wide variety of subjects and topics for a particular business. Agents are expected to perform their duties efficiently and effectively, but in practice, it is challenging for the agent to follow all applicable policies, have answers to all the different questions that may be asked, and know how to handle unusual situations. Contact centers may have various policies which are to be followed in varying circumstances, but any given agent may not be experienced in handling each type of situation or recall the particular policy. The policies may range from ensuring the agent provides an appropriate greeting to the remote party on the call, to asking whether a customer would take a survey.

Other policies may be specific to the purpose of the call. For example, when soliciting charitable donations, the contact center may have a policy of the agent confirming that the donor is not a minor (e.g., under the age of 18). Other call handling actions expected from the agent may be transient in nature. For example, a call center for a retailer may be offering a special promotion for the current week for customers purchasing goods above a certain dollar amount. Further, the promotion or dollar amount may change each week. The agent is expected to keep abreast of current promotions, but in practice it is easy for the agent to forget the specific details, requirements, or policies.

Thus, it is not surprising that a contact center agent may forget to comply with a specific rule or policy. In other situations, the agent may be complying with the rule or policy, but an opportunity is presented for providing superior customer service that the agent may not readily recognize. To assist the agent, various aids may be made available to the agent to remind the agent or identify the opportunity to the agent. Many of these aids, however, do not provide the flexibility for recognizing various situations. For example, a recently hired or inexperienced agent may require more indicators or reminders to identify such opportunities as opposed to an experienced worker.

Further, many of these aids rely on providing solely textual or visual information that is displayed to the agent. For example, a pop-up window providing internal written policies may be provided to an agent during a call. However, if the agent is not within viewing distance of their workstation, is distracted by the conversation with the remote party, or is visually impaired, such aids may not be fully effective in assisting the agent. In some instances, the agent may be familiar with the policy details and just needs a high level reminder, as opposed to a detail text-based explanation of the procedures.

Thus, improved and simplified approaches are needed for providing information and reminders to an agent for assisting the agent's interaction with the remote party. Further, there is a need for tools to assist the agent that can be utilized by visually impaired agents or which do not solely depend on visually-based notifications to the agent.

BRIEF SUMMARY

In general, various embodiments disclosed herein involve the use of a speech analytics system to control the provision of aural information to assist an agent in various contexts. The aural information assisting the agent may be referred to as a "whisper" or "whisper announcement." A whisper is audio, usually comprising speech, that is provided to an agent during a call, but is not heard by the remote party who is on the call. In one embodiment, the speech analytics system monitors the audio of the call between the agent and the remote party and determines when an opportunity arises to assist the agent. In one embodiment, the speech analytics system may provide a whisper to the agent, such as a reminder to the agent to perform a task or engage the remote party on a certain topic. In other embodiments, the speech analytics system may present agent assistance information in one form, such as a textual or visually-oriented form, and then if no reaction is detected by the agent, the speech analytics system provides agent assistance information in a different form, such as a whisper. In another embodiment, the speech analytics system may bridge on a supervisor onto a whisper conference bridge allowing the supervisor to provide the whisper audio to the agent.

As is discussed in greater detail below, the subject matter disclosed herein may be implemented as a computer-controlled apparatus, a method, a computing system, or an article of manufacture such as a computer-readable storage medium. These and various other features will be apparent from the following Detailed Description and the associated drawings.

This Summary is provided to exemplify concepts at a high level form that are further described below in the Detailed Description. This Summary is not intended to identify key or essential features of the claimed subject matter, nor is it intended that this Summary be used to limit the scope of the claimed subject matter. Furthermore, the claimed subject matter is not limited to implementations that address any or all disadvantages noted in any part of this disclosure.

BRIEF DESCRIPTION OF THE DRAWINGS

Reference will now be made to the accompanying drawings, which are not necessarily drawn to scale.

DETAILED DESCRIPTION

Figure 1:
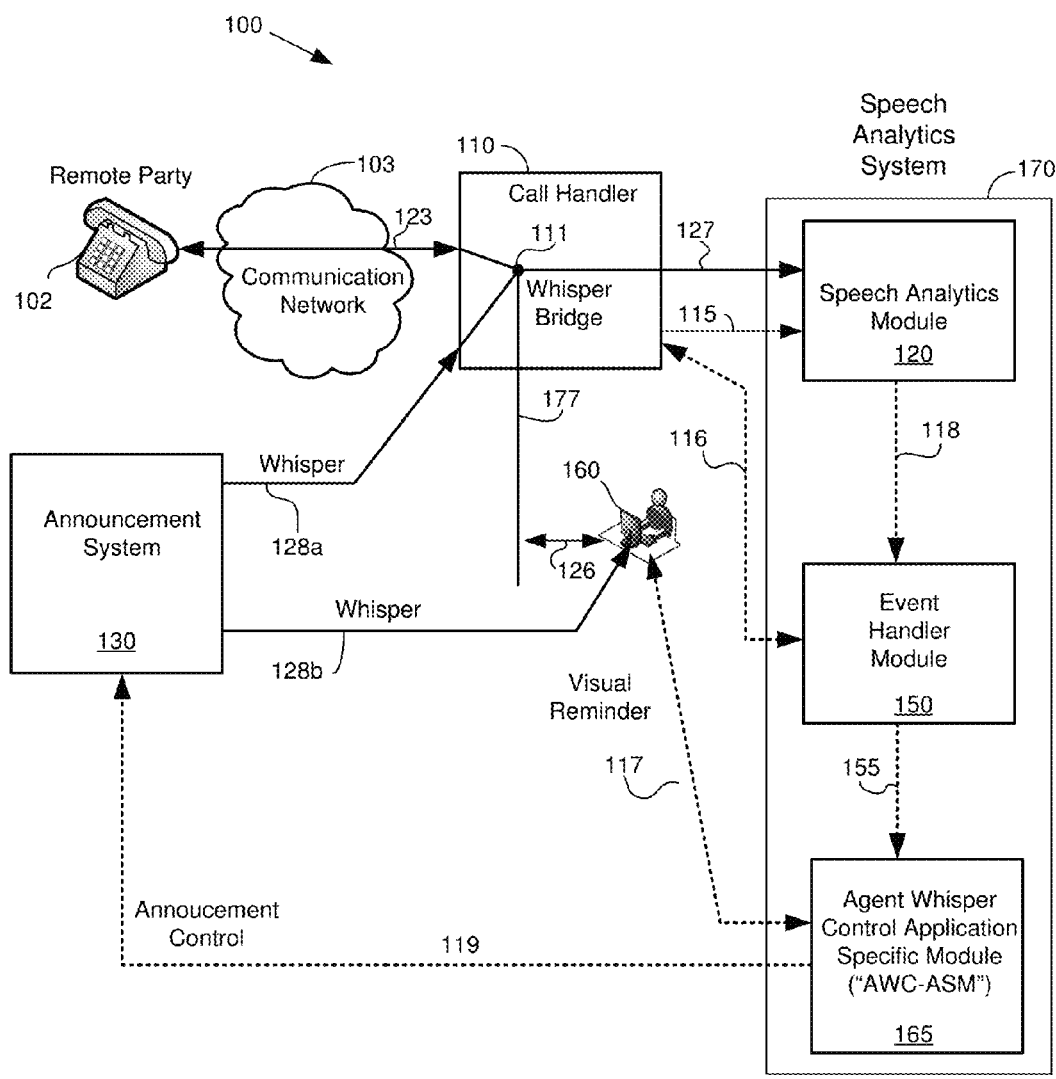
FIG. 1 illustrates an architecture of one embodiment of a contact center wherein a speech analytics system is used to control provision of a whisper to an agent during a call involving the agent and a remote party.

Various embodiments for practicing the technologies disclosed herein are described more fully hereinafter with reference to the accompanying drawings, in which some, but not all embodiments of the technologies disclosed are shown. Indeed, the embodiments disclosed herein are provided so that this disclosure will satisfy applicable legal requirements and should not be construed as limiting or precluding other embodiments applying the teachings and concepts disclosed herein. Like numbers in the drawings refer to like elements throughout.

Additional background information regarding the operation of the contact center with respect to a speech analytics system is provided in further detail in the disclosure of the above mentioned patent applications. This background information describes various components that may be present in a contact center, how event notifications from the speech analytics system are generally processed, and how application specific modules may process event notifications for specific calls to implement specific capabilities or applications. The description of the overall framework is not repeated herein, but incorporated by reference as described in the aforementioned patent applications to provide additional information relevant for using a speech analytics system for controlling whisper audio to an agent. In various embodiments, the whisper audio may be provided from an announcement system, a text-to-speech system, a pre-recorded file storage system, or from a human. In these various embodiments, the agent will hear the audio, but the remote party does not.

There are various examples in which an opportunity may arise to assist an agent during a call with a remote party. Such opportunities are referred to herein as an agent assist opportunity ("AAO"). An AAO may arise in various contexts and are typically dependent on the context, purpose of the call, or the management guidelines for the agent. For example, the contact center may require agents to confirm or inquire of certain information of the remote party. For example, in a customer service context, the agent may inform the caller of a special offer or request the caller to participate in a survey after their issue has been resolved. It is possible that an agent may forget to inform or ask the caller of this, and thus, there is an opportunity to assist the agent to remind them to perform a certain action.

In another example involving charitable donations, the contact center may have a policy in which the donor is verified as being an adult in certain situations, as various laws may prohibit soliciting donations from a minor. For example, an individual who is known to be an adult is contacted, but instead their nephew or child answers the phone and it is unknown whether they are an adult. After hearing of the charity's purpose, the answering individual may offer to provide a donation. In this case, it may be appropriate for the agent to confirm that the potential donor is over 18 years of age. Thus, this is another example of a potential AAO where the agent may be reminded of the need to verify the potential donor's status before proceeding with processing the donation.

Another example involves a remote party who had ordered an item on-line calling a customer service agent indicating that the wrong item of the order was packed and shipped to them. Because of a recent mix-up in fulfilling orders, the agents may have been notified at the beginning of the week that all such calls should involve consultation with a supervisor. Thus, an AAO exists in this type of situation in which the agent is to be reminded of the temporary procedures for handling such a call.

In another example, a remote party discussing a potential purchase with an agent may be informed by the agent of a "free shipping offer" for all purchases over $100 as an incentive to place the order. This presents another AAO in which the agent can be reminded to provide certain information to the remote party.

As evident from the above examples, those skilled in the art of contact centers can envision a myriad of opportunities in which the agent could be reminded of a particular procedure, policy, or opportunity to provide superior customer service that is expected by contact center management. The list of such opportunities is numerous, and these are but a few examples that can be used to illustrate the concepts and technologies herein and are not intended to limit the application of the principles.

The identification of an AAO may occur either in anticipation of the agent not recognizing or acting in advance of the opportunity or determining the agent did not act on the opportunity. For example, returning to the charitable donation solicitation example, it can be expected that agents are trained to verify that the donor is an adult. Experienced agents may know this, but novice agents may forget. In instances where this verification did not occur, the speech analytics system could identify the AAO based on the agent's lack of verification proceeding the actual solicitation of the donation, and provide an audible message (e.g., "verify age") to remind the agent to verify the age of the donor. Since every solicitation call presumably could lead to a donation, it may be irritating to the agent for the speech analytics system to remind the agent in each instance to "verify age" of the donor, as opposed to only in instances where the agent forgot to do so and when a solicitation was discussed. Thus, this type of AAO may be identified after it is determined the opportunity was missed by the agent.

In other examples, the speech analytics system could identify the AAO in an anticipatory manner. For example, returning to the example of where a customer purchasing a product is eligible for free shipping on a purchase, the speech analytics system may remind the agent of this opportunity prior to the remote caller actually purchasing a product. Specifically, the speech analytics system may deduce that the caller is asking various questions about a product, which may indicate hesitancy of the caller to consummate the purchase. The speech analytics system may identify this as an AAO and assist the agent in closing the transaction, by reminding the agent to inform the caller of the free shipping offer. While it is possible that once the agent takes the order, the ordering system may compute a zero shipping cost, informing the agent at this point does not proactively remind the agent to inform the customer, which could have been an opportunity for the agent to incentive the remote party to place the order. Thus, this type of AAO is provided in order to ensure the agent does not miss the opportunity.

The provision of information to assist the agent may include information to remind, inform, or otherwise command the agent. This is referred to herein as "agent assistance information" or AAI. The AAI can take various forms, namely aural or visual. The contents of the aural form is called a "whisper." The exact content or form of the whisper can vary, but it may be verbal and include a word, phrase, or sentence(s). There are other forms of aural AAIs, which are non-verbal, and may include sounds such as beeps, tones, buzzes, or other sounds, which can also serve as reminders or convey information. However, using a non-verbal sound is relatively limited because the number of distinct sounds that an agent can readily recognize is limited. Using a verbal whisper allows a large number of meanings to be easily conveyed.

The provision of the exact contents of the whisper to the agent depends on the speech analytics system identifying the particular AAO and acting upon it. Whether the AAO is identified by the speech analytics system in advance of the agent failing to appreciate the opportunity, during the time at which the agent does identify the opportunity, or past the time the agent should have identified the opportunity is a design consideration. In other words, the speech analytics system is not necessarily cognizant of which classification the AAO is associated with, but this may be useful to system architects when configuring the speech analytics system to identify the AAO. For example, one form of whisper may be used in anticipating the AAO while another form may be used after the agent failed to recognize an opportunity.

Once an AAO is identified by the speech analytics system, several actions may take place to inform or remind the agent of the opportunity. In one embodiment, a whisper in the form of a short audible verbal message functions to remind the agent of a particular action to be taken or information to assist the agent. For example, returning to the charitable donation example, the whisper could be a voice prompt indicating "verify age" and could serve as a reminder for the agent to ask the remote caller whether they are over 18 years of age. The whisper may also provide information to the agent, which may be useful to the agent in answering a remote party's question. For example, if the remote party asked about a maximum time period that is allowed for the customer to return an item, the whisper could provide information to the agent related to the question (e.g., "two months").

The AAI can also be visually based, such as text or an icon (referred to herein as "visual AAI"). A visual AAI can be provided to the agent on their computer display screen reminding them of a course of action. As noted earlier, this form of AAI may not be effective if the agent is visually impaired. In other instances, the agent may be using a wireless headset and has stepped away from their terminal such that they are temporarily out-of-view of their display screen. In other instances where the agent is not visually impaired, the agent may have a number of open windows on their display screen, resulting in a "cluttered" display screen, so that another pop-up window appearing may not be readily discernible. Thus, the whisper can be effective for helping agents fully take advantage of an opportunity where the agent may be unable to readily view textual information that would be displayed on a workstation computer or may not notice such visual information.

The provision of aural AAI can also be combined with the provision of a visual AAI. The provision of the different forms of AAI may occur simultaneously or serially. In some embodiments, a whisper may be provided along with a visual AAI that conveys the same information. In other embodiments, the visual AAI may be different from the information conveyed by the aural AAI. For example, the whisper may provide a high level reminder to the agent of a given expected action (e.g. "verify age") whereas the textual display may provide more detailed information about the requirements of the agent's actions (e.g., "verify that caller is over the age of 18"). In another example, the text display may indicate "verify age" and when the agent fails to do so, the aural AAI could be provided in the form of a warning tone, which signifies that the agent should review the visual AAI.

If the aural AAI (e.g., whisper) is provided serially with a visual AAI (e.g., text display), either the whisper or the text display may be provided first. The first AAI can be provided to encourage an action by the agent. This may be either e.g., the text display or a whisper. If no expected response is detected from the agent after a defined time period, then a second AAI can be provided in the other form. Finally, if an appropriate agent response is not detected, then a potential compliance issue may be written to a file. In other embodiments, an agent compliance score or rating may be determined. The provision of a visual AAI, for example a text display, may be initially provided to the agent, but may go unnoticed because of a "cluttered" display screen or because the agent cannot readily view the screen. The provision of a second AAI, e.g., a whisper, ensures that agent is reminded to take a course of action and avoids the potential difficulties of the agent not being able to readily view the screen. The provision of the second AAI can be contingent on the agent not acting on the first AAI. This provides a form of second reminder to the agent.

The provision of the whisper can originate from various sources, and this can be defined on a campaign level, on an agent level, and for a particular AAO on the call. It is quite possible that a given call may give rise to multiple AAO. Other combinations are possible. The sources of a whisper include an announcement system, which may provide pre-recorded audio announcements, tones, or other sounds. These may be recorded in the voice of the particular agent, or may be recorded in another voice. The announcements can originate from a distinct announcement system or from a speech analytics system which incorporates an integrated announcement capability. The whisper can also originate from a text-to-speech ("TTS") system which is integrated into the speech analytics system or is integrated into the announcement system.

Finally, the whisper may originate from a human. In this case, the whisper is not necessarily a short audible phrase that is interjected into the call to the agent by a separate system, but reflects the capability of the speech analytics system to conference into the call another person. This uses a special form of the whisper bridge, called herein a "whisper conference bridge." A whisper bridge allows the aural AAI to be provided to the agent without the remote party hearing the aural AAI. A whisper conference bridge allows another person, typically a supervisor or coaching staff, to listen in on the call to the remote party with the agent, and provide feedback to the agent during the call. As with the other instances of a whisper, the remote party does not hear the whisper. Although there are different embodiments of a whisper bridge, a distinction between a whisper bridge and the whisper conference bridge is that in the whisper bridge, the whisper audio source does not need to hear the audio of the call. However, in the whisper conference bridge, the coaching staff (which is the source of the whisper audio) does need to hear the audio of the call. In other words, a whisper bridge is typically used with recorded or TTS speech whereas a whisper conference bridge is typically used with a person.

The speech analytic system determines when a suitable AAO has occurred, and directs the announcement system or TTS to interject the whisper. In other embodiments, the speech analytics system may respond by also invoking a whisper conference bridge, which adds on a supervisor/coach onto the call. In this embodiment, the supervisor may determine the appropriate whisper, if any, to provide. This allows the supervisor to coach the agent during the call, which may be used if the call is considered problematic or to treat the call as a possible training or evaluation opportunity.

The various forms of the whisper bridge may be integrated into a call handler, into a separate system, or distributed among various components. For example, a portion of the whisper bridge may be implemented in the agent's computer, which may have a "soft phone" that provides the voice audio to the agent. A soft phone may include a phone implemented in a computer workstation via software that processes VoIP and provides the audio to the agent via a headset connected to the computer. In such instances, the aural AAI source may provide the whisper audio directly to the agent's computer, and a portion of the whisper bridge may be implemented in the agent's computer.

Contact Center Architecture

Turning to FIG. 1, a high level architecture 100 of one embodiment of the relevant components involved in a contact center is shown. The architecture 100 shows a remote party represented by a conventional telephone 102, although any number of devices and technologies may be used by the remote party. The remote party converses with an agent using call leg 123 of a contact center, and the remote party may be a calling party or a called party relative to the contact center. For purpose of illustration, and not for limitation, the examples herein focus on the contact center originating the call to the remote party, although it should be readily apparent that the principles can equally apply to calls received by the contact center. Although the remote party is shown as using a conventional telephone and the communication network 103 may be a telephone network, other networks and communications technologies may be employed, such as Voice over IP ("VoIP"), cable networks, mobile networks, etc.

The remote party receives a call that originated from a call handler 110 and is routed by the communication network 103. The call handler 110 may be one of any number of various devices used for processing calls in a contact center, including but not limited to: dialers, predictive dialers, automatic call distributors ("ACDs"), interactive voice response units ("IVRs"), private branch exchanges ("PBXs"), etc.

The call handler may connect the call leg 123 between the remote party and the agent. The agent may utilize a computer 160, which may be part of a workstation used by the agent and may also include a voice device (i.e., phone), such as a headset, telephone, or a so-called soft-phone integrated into the computer 160. FIG. 1 does not explicitly show a voice processing device separate from the computer, but some sort of phone device may be assumed to be present. A local area network ("LAN") 177 may be used to transfer voice and/or non-voice data to the agent's workstation and communicate with other components and over one or more links 126, channels, circuits, or other such constructs to the agent's computer. In other embodiments, separate facilities may be used for transferring data to the agent's computer and for the transfer of voice communication to the agent's phone. The exact technology and configuration of the agent's workstation at this point is not relevant, as long as there is a voice connection between the agent and the remote party. There may be a number of other configurations involved with respect to connecting the remote party and the agent, but this does not alter the principles of the concepts disclosed herein.

Once the remote party is connected to the agent, the call handler 110 may automatically bridge on a speech analytics system ("SAS") 170 to a whisper bridge (or simply referred to herein as "bridge") 111 using call leg 127. This arrangement allows the SAS 170 to monitor an ongoing verbal conversation between the remote party and the agent. The SAS may determine by monitoring the speech of the agent and/or remote party when an AAO arises. Once this has been determined, the SAS 170 may send a message over link 119 to an announcement system 130 to provide the appropriate whisper to the agent. The announcement system may be co-located in and part of the contact center. The announcement system may provide the whisper using a voice channel 128a or 128b. In one embodiment, the whisper is provided over voice channel 128a to the whisper bridge 111, which then conveys the whisper to the agent. The whisper bridge 111, however, ensures that the whisper is not provided to, nor heard by, the remote caller. In another embodiment, the voice channel 128b may be used, which bypasses the whisper bridge 111 in the call handler and provides the whisper directly to the computer 160, which is the provided to the agent. In this embodiment, a form of the whisper bridge may be implemented in the agent's computer 160 and ensures the whisper is not heard by the remote party.

In various embodiments, these components, namely the bridge, may be configured so that the agent only hears the audio from the whisper when it is being provided and the audio from the remote party is temporarily muted when the whisper is provided. In other embodiments disclosed herein, it is assumed that the whisper audio is merged with the audio from the remote party so that the agent hears both simultaneously (i.e., if the remote party speaks when the whisper is being provided). It is possible that if the remote party and the whisper occur simultaneously that the agent will not understand one or the other (or both). However, with experience and training, the agent is likely to understand at least the whisper instructions if it is provided while the remote party is talking. This is one reason why the whisper commands/reminders are typically short in duration, so as to minimize the potential overlap. In some embodiments, the whisper bridge may also incorporate a gain or volume control, which ensures the whisper is of a certain minimum or maximum loudness level.

In one embodiment, the SAS 170 may monitor the remote party's speech to determine a lull or temporary cessation of the remote party's speech and then send the message over link 119 to the announcement system to play the whisper. This may reduce the likelihood of the whisper being provided while the remote party is speaking. This may be accomplished by the SAS defining a time window for issuing the command, and if not sent by the end of the time window, then the command is sent nevertheless. However, in many cases, a party will speak to the agent for a few seconds, and then will take a pause or other form of audible break, providing a suitable window for the SAS to originate the command.

Returning to the SAS 170 shown in FIG. 1, the SAS comprises in one embodiment a speech analytics module ("SAM") 120, an event handler module ("EHM") 150, and an Agent Whisper Control Application Specific Module ("AWC-ASM") 165. These modules cooperate so as to monitor the speech present during a call, identify an AAO, and cause a whisper to be provided to the agent. The AWC-ASM 165 may also cause other forms of AAI to be provided to the agent. More will be said below as to how these modules cooperate to accomplish this.

Each of these modules 120, 150, 165 may comprise a software module comprising a set of computer instructions along with a separate hardware processing system. Or, the software may be integrated and executing in a single common hardware processing system. Other variations are possible. In some embodiments, the event handler module 150 and the ASC-ASM 165 are integrated into one module, while other embodiments may integrate the SAM 120 with the event handler module 150. It is also possible for some of the modules to be offered as a service by a service provider, or implemented in a premised-based solution by a contact center.

For example, in one embodiment, the call handler may be offered as a premise-based or a hosted service (e.g., in the "cloud"), and bridges on the SAS 170, which is also offered as a hosted service. The call handler and the SAS may be remotely located from each other and operated and controlled by different entities. However, all the agent computers may be co-located in a single physical location, which comprises the "premised based" call center portion. In other embodiments, the agent computers may be dispersed (e.g., work-at-home). Similarly, the announcement system 130 may be a hosted service, or co-located with the other system components. In this figure, the announcement system 130 is accessed as a local component to the contact center using a link 119, which may be provided using a LAN, such as the aforementioned LAN 177. To clarify the inventive concepts, the description is based on describing various functions and their interaction with each other, and it should be recognized that these modules may be deployed in various configuration, physical components, and at different locations.

For the SAS 170 to monitor the speech between the remote party and the agent during the call, a whisper bridge 111 can be used. In this embodiment, the whisper bridge 111 is shown as located inside the call handler 110. In other embodiments, a whisper bridge server or peripheral could be used. The whisper bridge allows three or four parties to participate in a common call, where each is connected by a call leg. A call leg may be either a bi-directional or unidirectional voice path(s). For example, each call leg in a conventional bridge receives audio that is distributed to each other call leg, whereas a whisper bridge is configured so that audio from a particular call leg is not necessarily provided to each other call leg to each other party on the whisper bridge.

The whisper bridge comprises one call leg that goes to the remote party, a second call leg that goes to the agent, a third call leg that goes to the SAS, and potentially a fourth call leg that goes to the announcement system. As will be seen, the announcement system may be integrated into the SAS, could be a text-to-speech system, or a human. From the perspective of the two endpoints associated with a call leg in a conference call, the call leg may be largely indistinguishable from a conventional call. Thus, a call leg involving two entities may be referenced herein as a call or as a call leg.

Use of the term "call leg" does not imply a particular form of technology. Nor does the use of that term imply any particular physical structure of the call leg. The call leg may represent a single virtual circuit, audio stream, link, connection, path, channel, or some other construct and/or name representing audio communications. Further, the reference to a bridge does not imply use of any particular form of technology, e.g., an analog bridge, digital bridge, etc.

The call legs can be implemented in a number of ways, and again it is possible to use a number of different technologies. It is possible that one call leg along its portion may use one technology, and another technology for the remaining portion, both of which may be distinct from another call leg using another technology. For example, the call leg to the remote party may be converted to an analog phone line with analog voice transmission to accommodate a conventional telephone, whereas the call leg to the SAS may be based on Voice over IP ("VoIP") technology. Similarly, the whisper bridge may be implemented to process voice in a single form, such as VoIP.

For purposes of illustration, in certain embodiments, although a single call leg is described as being established, that call leg may involve multiple virtual connections, voice channels, or audio streams. For example, the call leg from the call handler 110 to the SAM 120 may involve establishing multiple VoIP streams or virtual connections to the SAM. For simplicity, FIG. 1 shows a single line 127 associated between the SAM the whisper bridge 111, but the single line 127 in FIG. 1 can represent multiple VoIP streams associated with the call. There could be multiple VoIP streams received by the SAM in conjunction with the call leg to allow the SAM to separately analyze speech from the remote party and the agent. In other embodiments, this could be accomplished by using a single VoIP stream that conveys audio to the SAM, but using multiple streams facilitates the SAM distinguishing audio from one source from the other. Further, the call leg 127 depicts an arrow in the direction going to the SAM, implying a unidirectional path. More specifically, FIG. 1 does not show the SAS providing speech or audio back into the whisper bridge. There are embodiments, as will be seen, in which the announcement system may be integrated into the SAS, or the SAS incorporates a TTS system, such that audio is provided from the SAS to the whisper bridge.

However, in many embodiments only two separate VoIP streams are established to the SAM—one for the agent and one for the remote party. This is described further in the above identified patent application, U.S. Pat. No. 9,456,083. It may be advantageous to utilize this same architecture, which is based on the use of dual voice streams, for the principles and concepts disclosed herein. If so, then one VoIP stream to the SAM (which can be referred to as VoIP Stream #1 for convenience) conveys audio from the remote party only, and the other VoIP Stream (referred to as VoIP Stream #2) conveys combined audio from the agent. In some embodiments, the audio from the agent may include whisper audio as well.

A signaling link 115 between the call handler 110 and the SAM 120 provides the appropriate signaling information necessary to establish and terminate the VoIP streams on call leg 127 and indicate to the SAS the necessary information for when the call leg is established. However, in other embodiments, the signaling link 116 may also exist and may be used to convey such signaling information to the SAS instead of, or in addition to, the link 115. In FIG. 1, signaling or control data is generally shown as a dotted line and voice data is shown as a solid line. Use of the word "link" does not imply any particular logical or physical communication structure, protocol, or format used.

As previously indicated, the SAS 170 comprises the SAM 120, event handler module 150, and the AWC-ASM 165, which cooperate together to control the announcement system for providing the appropriate whispers to the agent. In other embodiments, the modules in the SAS cooperate to control an integrated TTS module or invoke a whisper conference bridge.

A primary function of the SAM 120 is to listen to the speech of the call and provide specific event notifications to the event handler module 150. In one embodiment, the SAM can be configured to listen to the speech from either the remote party or the agent (or both). In one embodiment, two VoIP streams are used for the call leg, so that the SAM can readily detect the remote party's speech and speech from the agent.

The SAM is typically configured to identify speech from the agent or remote party that is defined in the AWC-ASM to indicate that a specific form of an AAO is present. This determination is context specific, and may be defined for specific purposes as determined by the contact center management when configuring the SAS. Further examples and discussion of this is provided below. In general, the process begins with the SAM detecting certain words or phrases ("keywords"), which cause the SAM 120 to generate event notification. These event notifications are received by the event handler module 150 using link 118.

Event notifications are messages that indicate information about a call or about speech detected on the call. The former event notification messages are referred to as "call-related event notification messages" or simply "call-related event notifications" and these indicate the establishment or termination of a call leg to the SAM. The latter event notification messages are referred to as "speech-related event notification messages" or simply "speech-related event notifications" and these indicate detection of a particular keyword in the speech of a particular call. For simplicity, the "messages" qualifier may not be used in all instances herein.

The speech-related event notifications originate from the SAM 120 and are transmitted to the event handler module as depicted by link 118. For example, returning to the example involving soliciting charitable donations from a potential under-age donor, this condition may be defined as an AAO. The conditions could be detected when the agent asks the remote party, for example, "Would you like to make a donation?" The SAM can then report such speech occurrences to the event handler module 150. The event handler module ensures that the correct ASM receives the appropriate event notifications, as there may be a variety of application specific modules executing for various purposes. Further, there may be multiple simultaneous calls handled by the same ASM. Further, for a given call there may be a number of AAOs defined that can be detected. The event handler also ensures that the proper contextual information is provided to the proper ASM, which for this application is the AWC-ASM 165. This contextual information may include which call the speech-related event notification relates to (indicated by some form of call identifier), which party spoke the keyword (e.g., the agent or remote party), and of course, which keyword was detected (indicating the word/phrase or a particular context).

In contrast to speech-related event notifications for which there can be zero or many for a given call, there are typically only two call-related event notifications associated with a given call that are conveyed to the event handler module. The first is an indication that the call has been established and the other is that the call has been terminated. By definition, each call must have at least these two event notifications generated.

Because the speech-related event notifications are directly related to detecting keywords during a particular call, receiving a speech-related event notification requires that a corresponding call-related event notification was previously generated. The speech-related event notification references the call through some sort of identifier, and hence the identifier must have been previously generated.

In many contexts discussed herein, reference to an "event notification" for a call implicitly refers to a speech-related event notification for that call. Usually, the context in which the phrase is used will indicate whether the term "event notification" refers to both types or just refers to the speech-related type of event notifications. Furthermore, because each call is initiated and terminated, a corresponding call-related event notification indicating the beginning and end of the call is normally generated and assumed. The procedures for handling call-related event notifications are relatively straightforward and are similar for various applications. However, there may any number of speech-related event notifications and the processing of these is context and application dependent. The event handler ensures that only the speech-related event notifications defined for the whisper control process are sent to the AWC-ASM.

The call handler 110 provides information via signaling link 115 to the SAM 120 regarding call legs established from the call handler to the SAM, as well as call legs that are terminated because the call between the agent and remote party has been terminated. In some embodiments, the SAM may provide the call-related event notification messages to the event handler module using link 118. In other embodiments, the call handler may provide the call-related event notification messages to the event handler module using link 116. In either embodiment, the event handler module receives the call-related event notification messages and the AWC-ASM is aware of the creation and termination of call legs involving the call handler and the SAM, which correspond to the call legs created and terminated between the agent and remote party.

At a high level, the purpose of the event handler module is to route the event notification messages to the appropriate ASM. There may be a number of different types of ASMs defined, which may require receiving event notification messages. In one embodiment, the event handler module is configured to route a copy of each call-related event notification messages to each ASM, and route a copy of each speech-related event notification message to only the appropriate ASMs as defined. In other words, the event handler may route speech-related event notification message to each ASM, or selectively route the speech-related event notification to only certain ASMs. For example, if there are multiple ASMs used for different purposes, then the event handler ensures the proper ASMs receive the appropriate event notifications via link 155. Further information as to the reasoning and details of this operation can be found in the aforementioned patent applications incorporated by reference.

To recap, the event-handler module 150 receives event notifications, which may be either call-related or speech related. The call-related event notifications may be received from the SAM on link 118 or from the call handler on link 116. The speech-related event notifications are typically received from the SAM 120 on link 118. The event handler module informs the appropriate ASMs of the speech-related event notifications using link 155.

The AWC-ASM comprises the logic to handle the AAO and to take appropriate actions, such as command the announcement system (or other component) to provide the appropriate whisper. Several examples were given where the SAS may detect an AAO and cause a whisper to be provided to the agent. These were examples where a single aural AAI is provided to the agent. More complicated examples may incorporate multiple AAIs of different types during a call to an agent.

For example, an aural AAI provided to the agent may be preceded by, or followed by, a visual AAI to the agent. If the agent does not appropriately respond to one form of the AAI within a first time period, then a second reminder in a different form may be provided. An appropriate response can be determined, for example, by monitoring the speech from the agent by the SAS. If the agent does not respond within a second time period after the second reminder, then a non-compliance indication may be recorded for that agent. In other embodiments, the ASC-ASM may comprise logic to identify the AAO and, in response, cause the whisper conference bridge establish a call leg to a supervisor, who can coach the agent.

Whisper Conference Bridge

As shown in FIG. 1, the whisper bridge 111 may be located in the call handler 110 in one embodiment, and has call legs established to the remote party, the agent, the SAS, and the announcement system. The call leg to the announcement system may be established at the beginning of the call, even before an AAO is identified, or it may be established when the SAS identifies an AAO and the whisper is to be provided. Thus, during the call, the whisper bridge may be a three port whisper bridge, which then changes to a four port whisper bridge, and back to a three port, or it may simply be a four port whisper bridge for the duration of the call.

Figure 2:
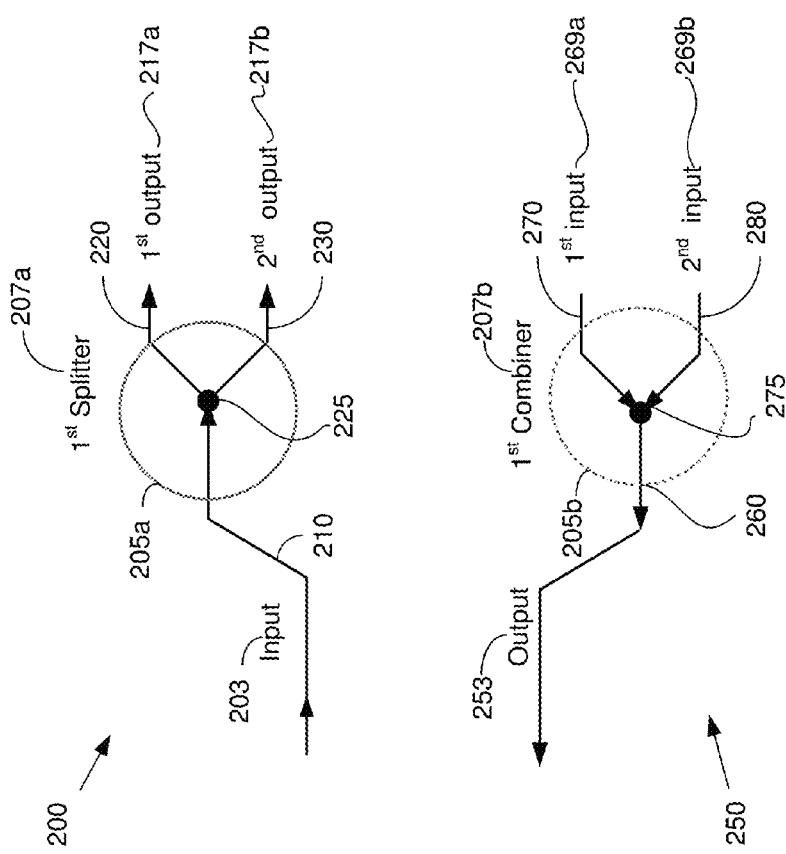
FIG. 2 illustrates constructs that may be used to build various embodiments of whisper bridges that may be used in conjunction with the concepts and technologies disclosed herein.

The whisper bridge may be, in one embodiment, a modified four-port conference bridge that is configurable to provide and receive audio information to and from particular parties on the call in a certain manner. A variety of technologies and architectures can be used to construct the whisper bridge. In the embodiment disclosed herein, an architecture is provided that can be used for constructing the whisper bridge from components that are optimized for handling digitized packetized voice, such as VoIP. The whisper bridge can be constructed in a modular arrangement using two components: a splitter and a combiner as shown in FIG. 2. Each of these components can be constructed in a variety of ways, including hardware or a combination of hardware and software. For example, processors that route and process voice packets can be used to form a splitter and/or combiner. Those skilled in the art of voice processing will recognize different methods for constructing these components in light of the present disclosure.

Turning to FIG. 2, the splitter 200 functions to receive an input and copy the information onto two outputs. The combiner 250 functions to receive two inputs and multiplex them on a single output. Focusing on the splitter 200 first, the splitter 200 can be implemented in a variety of ways, such as by using a router or a processor configured to perform a routing function which receives voice information and provides it to the appropriate outputs with the appropriate identifiers. This could also be implemented in hardware or a combination of hardware and software. Those skilled in the art will recognize in light of this disclosure that the splitter (and combiner) can be implemented in various ways.

The splitter 200 receives information, typically representing voice or packetized voice samples at an input 210 that are then duplicated at a first output 220 and a second output 230. A node 225 represents the duplication processing. Since the splitter is a module which will be used to construct the whisper bridge, the following convention is used to aid in understanding the more complex structures. First of all, a solid circle 205a is used to facilitate visually identifying the splitter. An alpha-numeric label 207a of the identifying name of the splitter is provided ("1$^{st}$ Splitter"), along with alpha-numeric labels 217a, 217b referencing a first output and a second output. These labels function to only distinguish and identify the two distinct outputs and no priority is implied by the labels of "first" or "second." A label 203 for the input may be shown, but because a splitter has only one input, the input is typically not labeled as such in the figures herein. Referencing the input of a particular splitter is sufficient to identify that point with particularity. Further, directional arrows may be included on the diagram to aid in showing the direction of the flow of audio information. In a splitter, information always flows into the single input and to the two outputs.

A splitter may be referred to by the alpha-numeric label 207a (e.g., "1$^{st}$ Splitter", "first splitter" or "1 S") and a particular output may be identified as a "1$^{st}$ output" or a "2$^{nd}$ output" (alternately, "1st out" or "2nd out") 217a, 217b. These may be combined in a shorthand manner—e.g., "1$^{st}$ out 1S" for the first output of the first splitter. This convention is sufficient to uniquely identify a particular leg into or out of a particular splitter and reference numerals are not always used in the following figures for clarity.

The combiner 250 functions in the reverse, namely to receive two inputs and then multiplexed the inputs onto a single output. The output label 253 may not always be indicated, since there is only one output 260 on a combiner. A dotted circular line 205b further aids in visually identifying and distinguishing the combiner, and an alpha-numeric label 207b can be used to identify and distinguish the specific combiner, such as "1$^{st}$ Combiner" or "1 C". Since there are two inputs 270, 280, labels 269a, 269b can be used to distinguish the inputs (e.g., "1$^{st}$ input" or "1$^{st}$ in"). A node 275 represents the combining of audio information.

Figure 3:
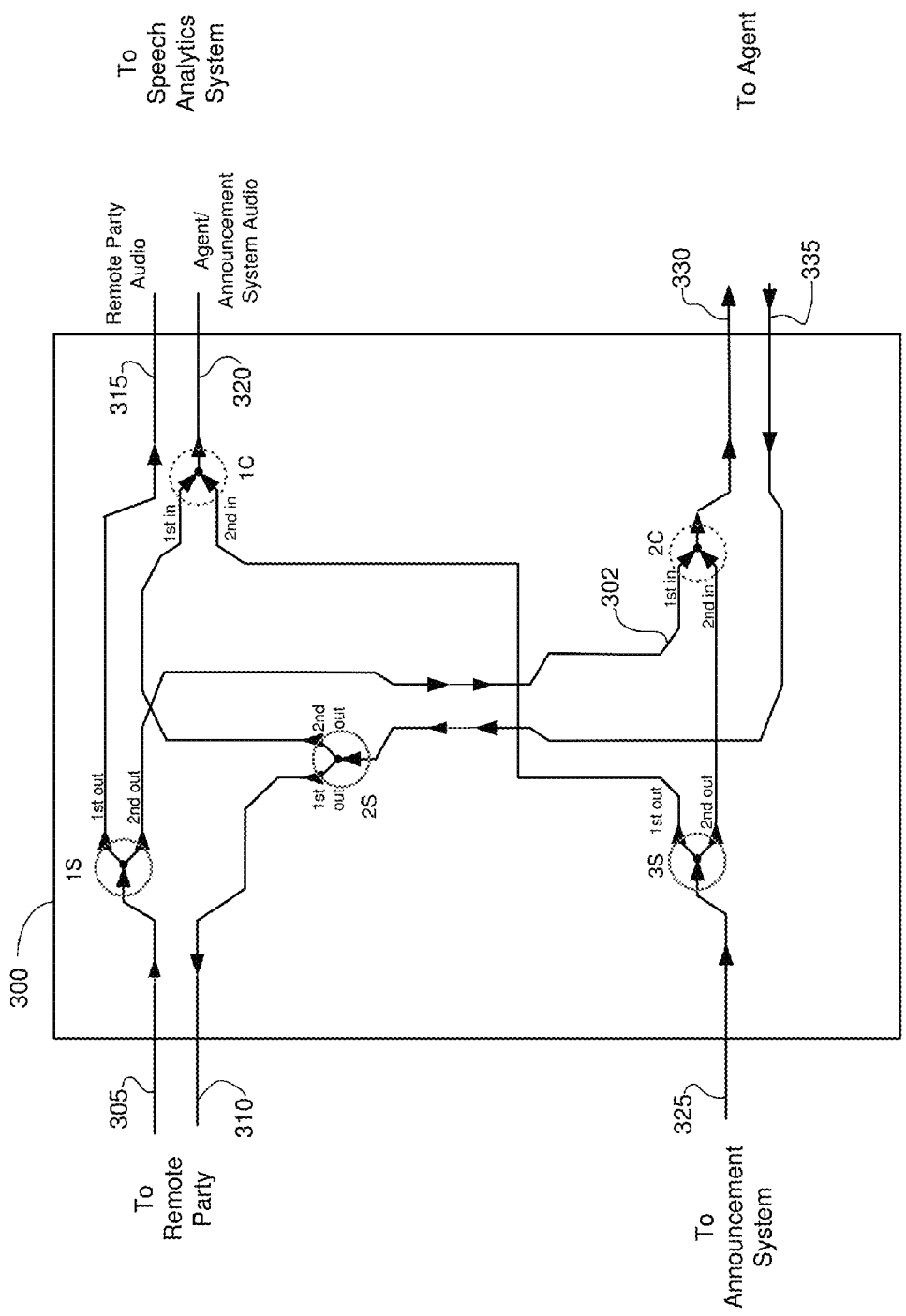
FIGS. 3-5 illustrate various embodiments of the whisper bridges that may be used in conjunction with the concepts and technologies disclosed herein.

There are various embodiments of a whisper bridge, depending on the desired operation, and these can be described as variations that incorporate common basic structures based on the splitters and combiners. Once such embodiment is shown in FIG. 3 and involves four ports (i.e., a port is one or more voice paths to a distinct entity).

The structure of this whisper bridge 300 is designed to provide a port for the remote party that is bidirectional and allows the remote party to hear the agent, but not the whisper. The agent is also provided a port and can hear both the remote party and the whisper. The announcement system is provided a port, but it only provides the whisper and does not need to hear the other parties. Finally, the SAS has a port, which in this embodiment comprises two audio streams—one from the remote party 315 and one from the agent/announcement system 320. This facilities identifying which audio is from which party. Even though the SAS has two streams, this is still considered a single port of the whisper bridge and referred to as involving a single call leg.

To facilitate the explanation of the whisper bridge operation, the nomenclature used herein involves referencing a component in the three-port bridge by identifying a particular splitter or combiner, in conjunction with an appropriate indicator of "output" or "input." If the device has multiple inputs or outputs, then a particular "first" or "second"

qualifier is used. Thus, the $1^{st}$ input to the $2^{nd}$ Combiner 302 (also referred to as "$1^{st}$ in-2C") is identified in FIG. 3. This is equivalent to the audio produced from the $2^{nd}$ output of the first splitter ("$2^{nd}$ out-2C").

Turning to FIG. 3, some of the audio flows are now examined to aid in the understanding of its operation. Turning first to the port involving the remote party, there is an input 305 to the whisper bridge 300 that is received by the first splitter ("1S"). This audio is sent as the output 315 of the port connected to the SAS. This output 315 represents audio from the remote party. Thus, the SAS can readily identify audio from the remote party as the audio present on output 315. The audio from the remote party is also duplicated by $2^{nd}$ out-1S and sent to $1^{st}$ in-2C. Thus, the agent also hears the audio from the remote party as well.

The whisper from the announcement system is provided as an input 325 on another port. The announcement system only provides audio to the whisper bridge and does not receive audio. The audio from the announcement system is received at the input of 3S, and the $1^{st}$-3S out is provided to $2^{nd}$ in-1C, which in turn is provided to the SAS. Further, the whisper is also provided on $2^{nd}$ out-3S, which is further combined and provided to the audio 330 to the agent. Thus, the whisper is heard by the SAS and the agent. In some embodiments, the whisper may not be provided to the SAS. However, doing so allows the SAS to monitor the provision of a whisper and the SAS can detect when a whisper is provided.

There are other audio flows that exist in FIG. 3. For example, audio from the agent is provided to the remote party and the SAS, but not the announcement system. Those skilled in the art can trace all the possible flows of audio information in FIG. 3. Some of the salient aspects of this embodiment of a whisper bridge is that the SAS hears the audio of the remote party on one stream 315, and the audio of the agent/whisper on another stream 320. Further, the remote party does not hear the whisper, but the agent does hear the whisper on one stream 330. Audio from the agent 335 is provided to the remote party via output 310 and the SAS via output 320. Finally, the SAS does not provide any audio into the whisper bridge, and the announcement system does not receive any audio.

Figure 4:
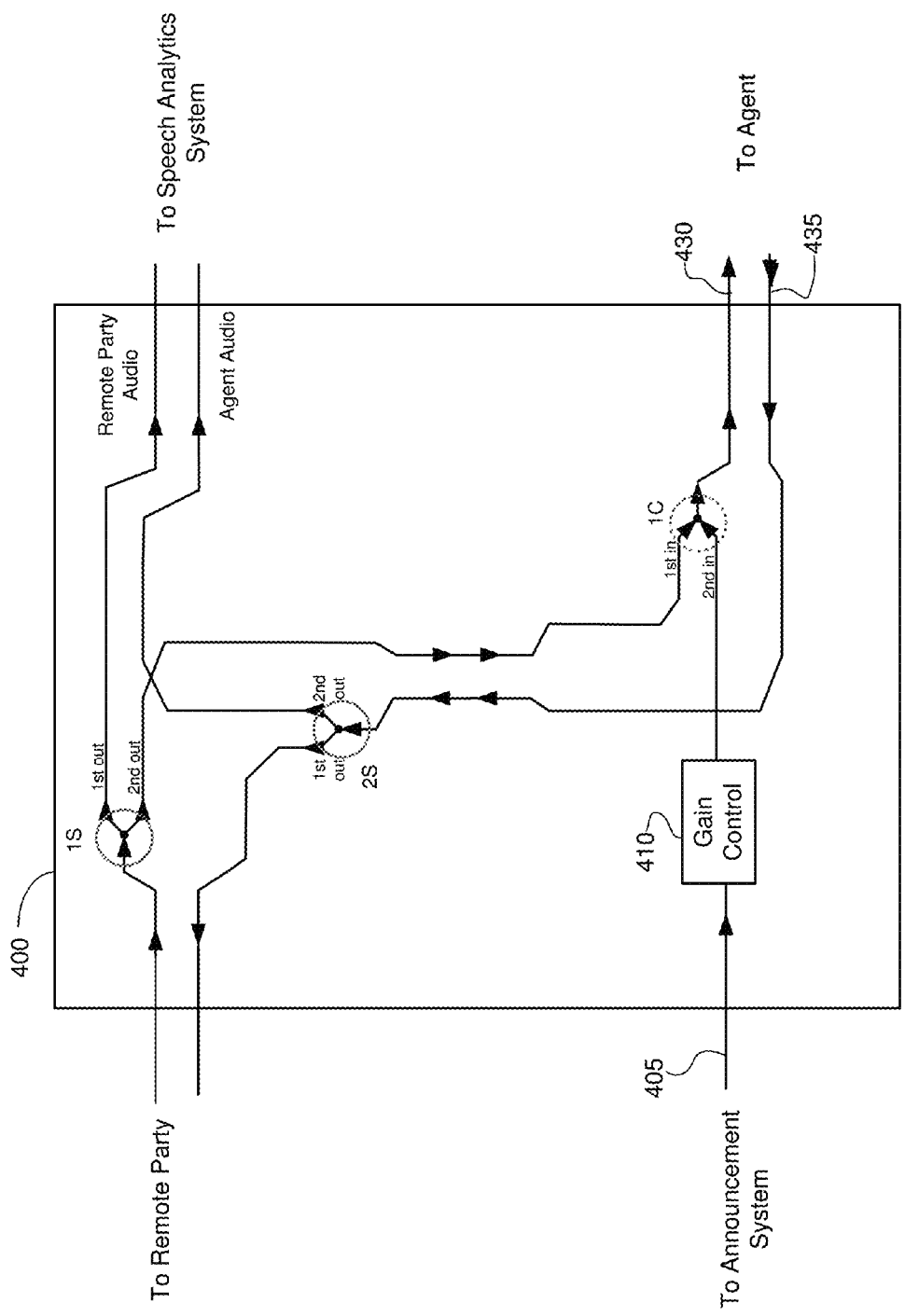

Another embodiment of a whisper bridge 400 is shown in FIG. 4. This embodiment can be viewed as modifying the embodiment of FIG. 3 by removing the first combiner (1C) of FIG. 3. Removing this combiner means that the SAS in FIG. 4 does not hear the whisper. In FIG. 4, the audio channel 405 from the announcement system is received as the $2^{nd}$ in-1C which is provided on audio channel 430 to the agent. There is no provision of the whisper to the SAS, thus, there is no need for 1C of FIG. 3. In FIG. 4, audio from the agent is received on an input 435 and provided to both the SAS and the remote party.

Thus, the salient aspects of this embodiment of the whisper bridge 400 is that the SAS hears the remote party on one audio channel and the agent audio on another audio channel, but does not provide any audio into the bridge. The announcement system provides whispers as an input to the whisper bridge, and the whisper is only received by the agent, and not by the SAS or the remote party.

Also shown in FIG. 4 is a gain control module 410. This is an optional module which can ensure a certain limit the audio level of the whisper to the agent. This may be present in other embodiments of the whisper bridge, but is only shown in FIG. 4 for simplicity. This ensures that a desired audio level of the whisper is maintained when provided to the agent on voice channel 430. This can ensure that the whisper does not exceed a certain level, or does not drop below the certain level. In some embodiments, the AWC-ASM may control the gain or volume.

Figure 5:
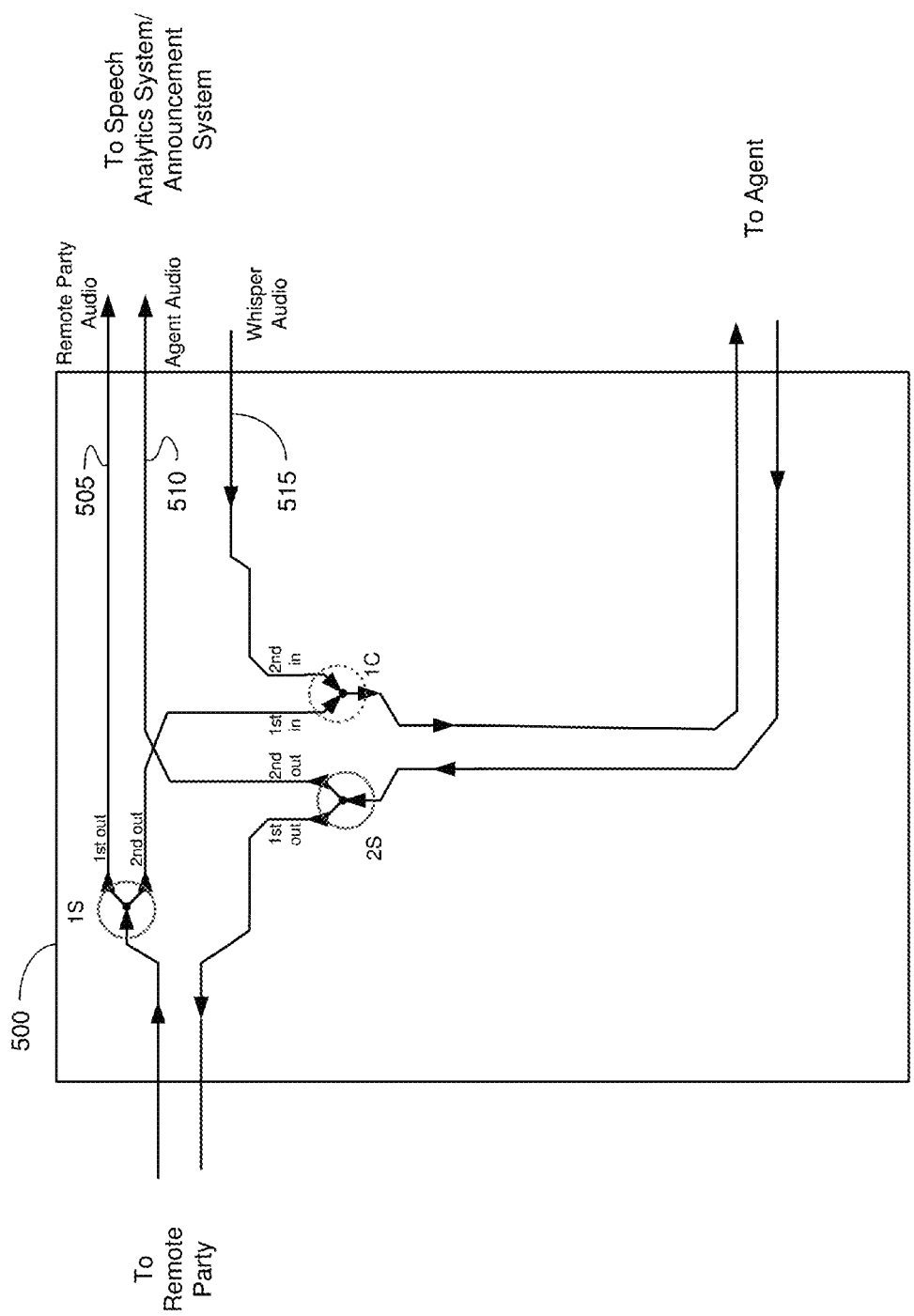

Another embodiment of a whisper bridge is shown in FIG. 5. In this embodiment, the whisper bridge 500 is configured to accommodate a SAS that incorporates an integrated announcement capability, or a TTS, for providing the whispers. In this embodiment, the bridge 500 comprises two splitters and one combiner. The whisper bridge 500 has three ports, with one part for the SAS and having two voice channels 505, 510. One channel 505 is for receiving audio from the remote party and the other voice channel 510 is for receiving audio from the agent. A separate voice channel 515 conveys the whisper from the SAS to the bridge 500. The whisper audio is received at $2^{nd}$ in-1C is then provided to the agent. Thus, the agent hears the whisper, but the remote party does not.

In summary, the various embodiments of the whisper bridges shown in FIGS. 3-5 accommodate either separate or integrated announcement systems relative to the SAS. Further, the whisper bridge can be configured so that the SAS can monitor the provision of the whisper. If this is not required, then the whisper bridge construction is simplified. Although these embodiments illustrate how the various splitters and combiners can be configured and integrated into a single whisper bridge located in the call handler, these components could be implemented in a bridge that is external from the call handler, or in a distributed manner. For example, some of the splitters and/or combiners could be implemented in the agent's computer. Specifically, for example, the combiner 1C in FIG. 4 could be located in the agent's computer, resulting in the agent's computer receiving a first audio channel from the whisper bridge and second audio channel from the announcement system. Thus, there are various distributed arrangements of implementing the combiners and splitters in various configurations.

Service Overview

As evident, there are a variety of contexts and applications for identifying an AAO and providing AAI to agent. Many of these applications or contexts may be relatively focused and highly specific. The example presented herein may be more complex than other embodiments, but illustrates various capabilities that may be used in other embodiments. In many simpler embodiments, only a single aural AAI (i.e., a whisper) is provided to the agent as a reminder. In other embodiments, multiple forms of AAI may be provided to the agent, where one of them is a whisper. Further, agent reaction to the AAI can be gauged and used to influence how and whether subsequent AAIs should be provided to the agent. This is illustrated in the overview provided below.

Figure 6:
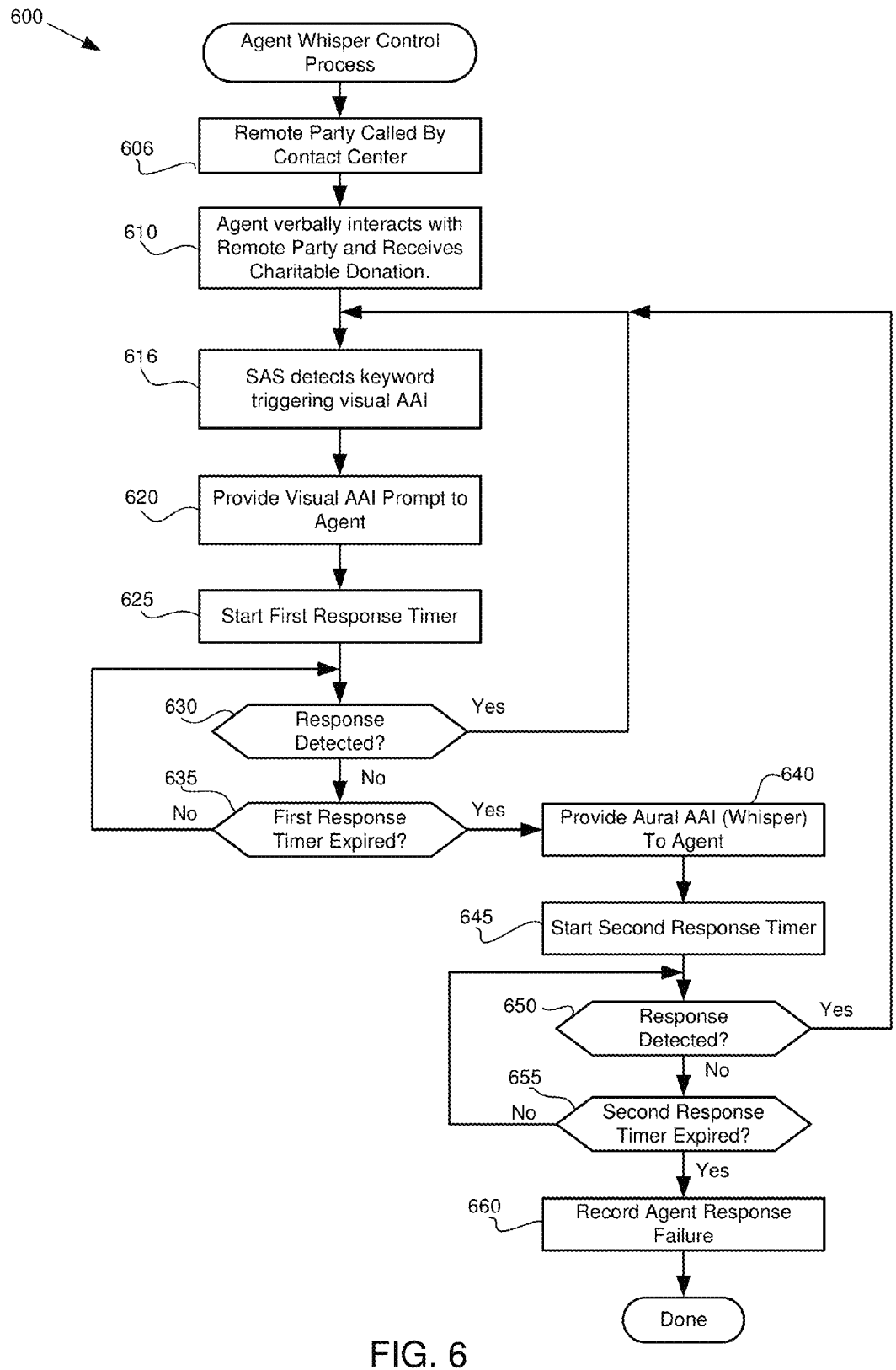
FIG. 6 illustrates one high level process flow of an embodiment associated with providing the agent with agent assist information during a call.

The high level overview 600 shown in FIG. 6 involves detecting an AAO during a call, providing first a visual based AAI to the agent in response thereto, determining whether the agent has properly responded to the first AAI, and if not, then providing a second AAI in the form of an aural AAI comprising an audible whisper to the agent, and then determining whether the agent has reacted to the second AAI in some manner. If not, then a potential agent compliance violation is recorded. This example used herein builds upon the aforementioned charitable donation example, although the principles could be applied to other contexts.

The process 600 begins with the remote party being called by the contact center in operation 606. The agent verbally interacts with the remote party in operation 610. During the interaction, the SAS monitors the dialogue. For example, the SAS may monitor the dialogue to determine whether there was 1) any inquiry by the agent that the potential donor is over 18 years of age, and 2) whether the dialogue involves discussion of a charitable contribution.

The AAO may be triggered by logic in the SAS by detecting certain keywords in operation 616. For example, the SAS may have determined there was no inquiry of the potential donor's age and there is now discussion of a potential donation amount. This context may reflect that the agent is waiting to confirm the donor's age after a commitment is agreed to, or this context may reflect that the agent forgot to inquire.

The SAS responds to the AAO by providing a visual AAI in the form of a text-based reminder, such as in a pop-up window, on the agent's computer screen in operation 620. Further, the SAS starts a first response timer to determine if the agent responds to the visual AAI in some manner in operation 625. The agent response could be: selecting an icon in the pop-up window confirming reviewing the reminder, the agent invoking another function, or simply asking the remote party to confirm they are over 18 years of age.

If an appropriate agent response is detected in operation 630, the process then loops back to 616 where the SAS continues to monitor the call for keywords that indicate an AAO. The detection of an appropriate response depends on the nature of the response. For example, if the appropriate response is to confirm the donor is over 18 years of age, the SAS could monitor the agent's speech for this response. However, if no such appropriate response is detected in operation 630, then the test for an appropriate response is repeated by checking whether the first response timer expired in operation 635. If the first response timer does not expire in operation 635, then the process loops back to operation 630, which continues to monitor for a response.

If the first response timer in operation 635 does expire, it means that the agent has not acted upon the visual AAI provided to the agent. For example, no speech may have been detected from the agent that involved asking the called party whether they are over 18. Assuming the agent is not visually impaired, this may signify that the agent is not able to readily view their display screen, or such information was not readily cognizable by the agent. Thus, the SAS determines that it is appropriate to provide an aural AAI in the form of a whisper to the agent in operation 640. This may presume that the whisper bridge is already being used in the call.

After providing the whisper, a second response timer is started in operation 645. If an appropriate agent response is detected in operation 650, the process then loops back to operation 616 for detecting another relevant keyword. If no response is detected in operation 650, then a test of the second response timer is checked in operation 655. If it has not expired, then the process loops back to operation 650 to check whether an appropriate response has been detected. If the second response timer has expired in operation 655, then this indicates the agent has ignored both the visual AAI and the aural AAI. In this case, a record is made of the agent's failure to respond in operation 660. This can impact an agent compliance score or rating in a negative manner. The process has completed at this point.

In other embodiments, an alert could be sent to the agent's supervisor, another aural AAI could be provided (e.g., an audible warning tone), or some other action to escalate the seriousness of the situation to the agent.

The detection of a suitable response from the agent may be determined by the SAS monitoring certain words appropriate for the given context. Determining whether there is a suitable response to the whisper may be related to the same processing that determines whether an AAO is triggered. For example, determining whether there is an inquiry to the potential donor as to whether they are a minor may be the basis for identifying the AAO. Specifically, if no such speech is detected of inquiring of the donor's age, then the AAO may be presumed to exist. However, after the agent is provided the whisper, detecting these same keywords for the donor's age inquiry can be deemed as a suitable response to the whisper.

The process flow shown in FIG. 6 is but one embodiment how the various forms of AAI may be provided to the agent at various times and under various contexts. In other embodiments, only a whisper may be provided and no follow up analysis is performed to determine whether a suitable agent response was provided. For example, the AAO may be triggered by a question from the remote caller asking the agent about a return policy—e.g., what is the time period in which a product purchased can be returned. The SAS may provide a whisper to the agent indicating relevant information, e.g., "two months." The SAS may not necessarily monitor whether the agent actually provided the information to the remote party, but merely inform the agent of the time period.

Process Flows for Event Notifications

Figure 7:
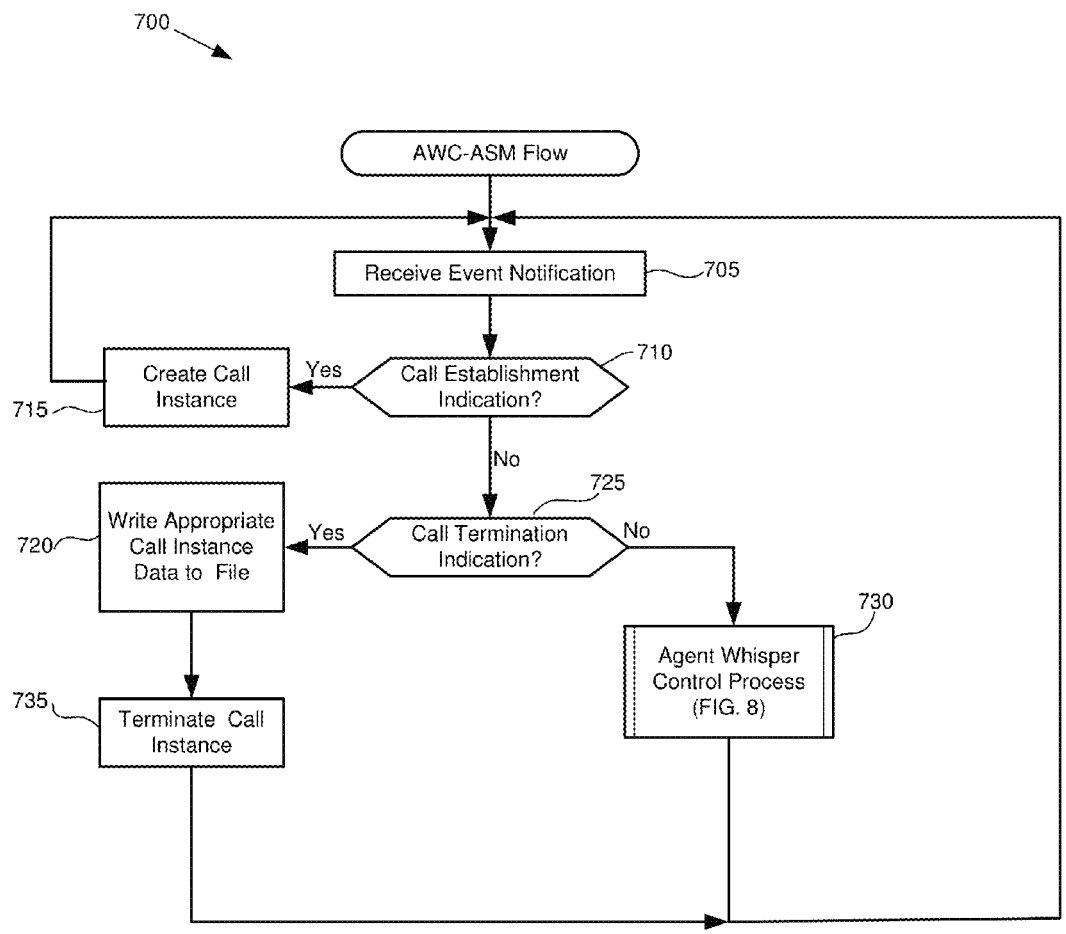
FIGS. 7-9 illustrate process flows of embodiments associated with processing event notifications in the speech analytics system.

The process flow for event notifications describes how event notifications are processed in the ASM to realize the above defined service flow. The logic defined in the AWC-ASM operates on each call independently from other calls. The processing in the AWC-ASM involves processing both call-related event notifications and speech-related event notifications. Two separate figures are used to describe the processing for these. The first process flow, shown in FIG. 7, represents the process flow for processing call-related event notifications in the AWC-ASM. Recall that these event notifications inform the AWC-ASM of the establishment and termination of a call between the call handler and the SAS (specifically, the SAM). The call-related event notifications are sent when the SAS is bridged onto (and removed from) the call between the agent and remote party.

Relative to processing the speech-related event notifications, the processing of call-related event notification is relatively straightforward and similar, as each ASM (including the AWC-ASM) typically creates a separate call instance for each call (i.e., for each call leg bridged to the SAM). The call instance is a data structure defined for the ASM maintaining data specific to a call. When establishment of a call is reported, these ASM specific data structures (referred to herein as the "call instance" data structure) may be generated. In one embodiment, the call instance comprises information allowing identification of the call and includes identifiers associated with the various VoIP streams, to allow identification of which party is associated with which VoIP stream. Other information, such as the time the data structure was created may be included. The call instance may then be modified or referenced when subsequent speech-related event notifications are received for that call. Then, when the call is reported as terminated via a subsequent call-related event notification, the call instance (or selected portions thereof) may be saved, processed, and/or erased as appropriate.

Turning to the process flow 700 of FIG. 7, the process begins with receiving the event notification in operation 705. A test in operation 710 determines whether the event notification indicates a call establishment. Reference to a "call establishment" refers to creating call legs from the call handler to the SAM, which occurs typically when the call between the agent and remote party is created. Creating a call leg may reflect, for example, allocating a new identifier for a logical voice packet stream or establishing a virtual circuit of some form. There may be multiple voice channels or streams associated with a call leg.

If the event notification received is a call-related event notification indicating establishment of a call leg, then the process proceeds to operation 715 where a call instance is created in the AWC-ASM. This call instance is associated with the call that was just reported as being generated. The call instance can be associated with the call by using a reference identifier, call number, or some other similar form of call identifier. The creation of the call instance results in generating and initializing a data structure stored in the memory of the AWC-ASM, and may further include the audio stream identifiers of the agent and remote party. The call instance data structure is defined by the AWC-ASM and is typically unique relative to other call instance data structures generated by other ASMs.

If the event notification is not a call-related event notification indicating call establishment in operation 710, then the next test is to determine whether the event notification is a call-related event notification that reports the termination of the call in operation 725. If so, then the process continues to operation 720 where any appropriate data stored in the call instance is then saved (if desired) by writing it to a file (e.g., an agent compliance file). Saving the call instance data retains the desired information of the audio context for later review. In this application, information about an agent failing to respond to a prompt of confirming a donor's age may be recorded for agent evaluation purposes. Each occurrence, including information about a time, agent, context, etc. could be stored. This allows administrators to review potential problems or issues with the agent conforming to a particular policy. After appropriate call instance data has been saved, the call instance data structure can be terminated in operation 735. The operation then returns to wait for the next event notification message in operation 705.

If the event notification is not a call-related event notification in operation 725, then the process flow continues from operation 725 to operation 730 that presumes the event notification is a speech-related event notification. Operation 730 reflects the processing of speech-related event notifications in the AWC-ASM, which detailed in FIG. 8.

The call-related event notification process flow shown in FIG. 7 is somewhat generic for the different types of ASMs that can be defined in a SAS. Namely, regardless of the ASM's purpose, call instances in an ASM are usually created in response to receiving a call-related event notification indicating call establishment. Then, any data generated during the call may be reflected in the call instance and saved when the call terminates. In many instances, there may not be any intervening speech-related event notifications received during the call, so there may not be any changes to the call instance during the call. Thus, a call instance may be generated and erased, without any speech-related event notifications ever having been received. In the case of the AWC-ASM, this could reflect the possibility that a remote party was involved in a dialog with an agent, and the SAS never detected an appropriate AAO during the call. For example, returning to the example involving a charitable donation, the called party may indicate that they are not interested in making a donation, and consequently, the SAS did not ascertain an appropriate AAO and thus, there is no need to provide the whisper to the agent.

Figure 8:
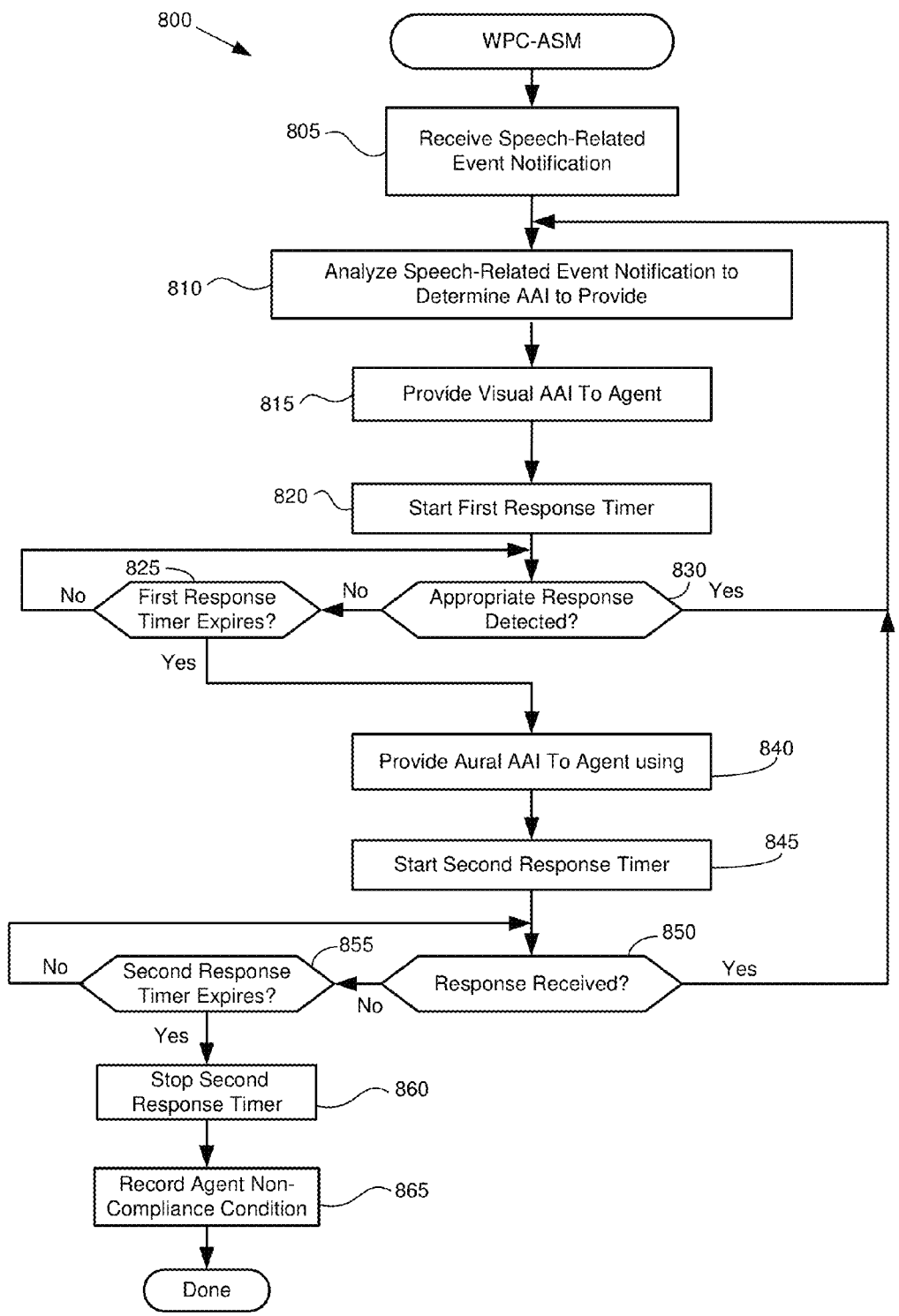

A process flow is shown in FIG. 8 for handling the speech-related event notifications based on the application previously described in which a visual AAI and then an aural AAI is provided to the agent. The process flow is dependent on the particular context and the opportunity that is intended to be detected. Other context may detect a different situation (e.g., failure to confirm a telephone number or credit card number) and provide a different procedure for providing the visual AAI.

The process 800 begins with the AWC-ASM receiving a speech related event notification in operation 805. The contents of the event notification are analyzed and it is determined that a visual AAI is appropriate in operation 810 to remind the agent of the need to confirm the donor is not a minor. This reminder, which is the first of two AAI, is provided as a visual AAI in operation 815. Assuming the reminder is text based, the appropriate information is provided to the agent's computer using a pop-up window. Other embodiments could use an icon. Next, a first response timer is started in operation 820. This timer determines if the agent has reacted properly to the first visual AAI within the time period. This could occur by monitoring the speech of the agent. If so, these procedures would also be defined in the AWC-ASM. For example, if another speech-related event notification is received indicating the agent asked to confirm the remote party's age or whether they are a minor, then that could constitute an appropriate response in operation 830.

If an appropriate response is detected in operation 830, then the flow loops back to operation 805 to process additional event notifications. Otherwise, a test determines if the first response timer expires in operation 825. If not, then the process loops back to operation 830.

If the first response timer expires in operation 825 without having received a suitable response from the agent, a second reminder prompt is provided to the agent. In this example, it will be in a different form from the first prompt, which is an aural AAI, i.e., a whisper in operation 840. A second response timer is started in operation 845.

If an appropriate response to the whisper is detected in operation 850, the process loops back to operation 805 to continue monitoring speech-related event notifications. There may be other contexts which are detected. Otherwise, if an appropriate agent response is not received, then another test determines if the second response timer expires in operation 855. If not, the process loops back to operation 850 in order to continue checking for a suitable response. Otherwise, the process proceeds to operation 860 where the second respond timer is stopped, and an agent non-compliance condition is recorded in the call instance data structure in operation 865.

Additional actions could be taken if the agent fails to respond after the second AAI, such as notifying a supervisor, providing a third AAI to the agent in a non-verbal aural form (e.g., a loud beep or warning tone). The AWC-ASM could further adjust the volume in the whisper bridge for the third AAI to ensure that the agent does not ignore subsequent warning.

Simplified AWC-ASM Embodiment

The above process flow of the AWC-ASM provided two types of reminders to an agent, and further monitored whether the agent responded appropriately to each reminder. In other embodiments, the process flow of the AWC-ASM may simply determine that a whisper is to be provided, and does not monitor the agent's response, nor does the AWC-ASM provide a first and a second reminder.

Figure 9:
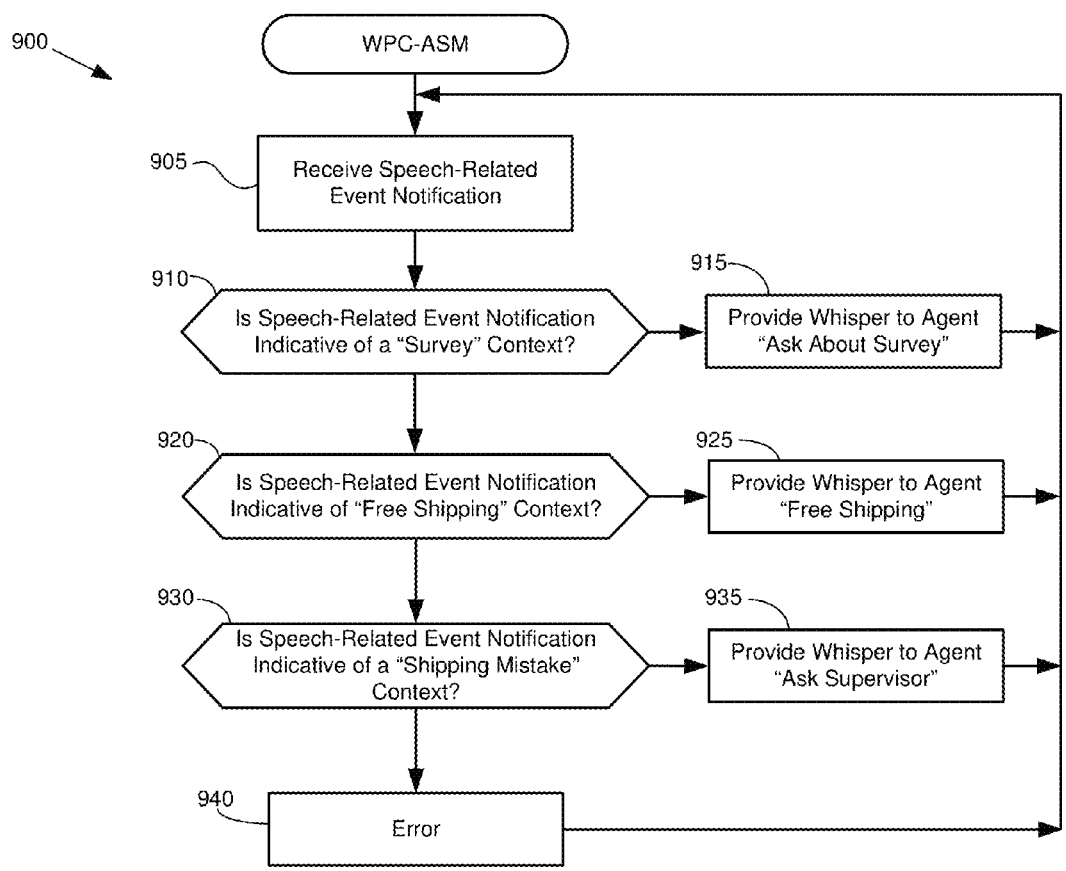

An example of an alternative process flow is shown in FIG. 9. This process flow checks for three distinct contexts for which three different whispers are provided to the agent. In each case, the whisper is provided without any analysis of whether the agent responded in a certain way. In other embodiments, some contexts could warrant analysis and further action, while others do not.

The first context is to determine whether at the end of a call, the agent has asked the remote party to partake in a survey. If not, then the agent is provided a whisper to "Ask about survey" or simply "Survey." The second context involves providing a reminder to the agent for customers about a current promotion involving free shipping. The whisper may simply indicate "Free Shipping." This reminds the agent to inform the potential customer about free shipping on orders above a certain amount. The third context is associated with a temporary issue in which orders were fulfilled incorrectly. Thus, customers complaining about an incorrect shipment should be given special treatment, which may require placing the caller on hold while the agent consults with a supervisor or bridging on a supervisor. In this case, the whisper may simply be "Ask Supervisor."

Turning to FIG. 9, the process 900 involves receiving a speech-related event notification in operation 905. In this example, three specific AAOs for the three contexts are identified, and each one will be associated with a particular set of keywords. The vocabulary of the keywords that may be detected for a particular context obviously depends on that context that is designed to be detected. Because a variety of words may be used to detect the context, the speech-related event notifications could report the particular keywords detected or simply identify which context was detected.

The first context involving a survey will involve detecting keywords indicative of the call being completed. For example, one keyword phrase may be "anything else I can help you." For purposes of reference, this is referred to as the "survey" context. The second context involves a promotion involving free shipping, and this may involve detecting keywords, such as "promotion", "special offer", or "limited time." This is referred to herein as the "free shipping" context. The third context may involve detecting another set of keywords such as "mistake", "order", "received" "wrong item." This is referred to herein as the "shipping mistake" context.

A first test determines if any of the keywords indicated in the speech-related event notification are associated with the survey context in operation 910. If so, then the process flow continues to operation 915 where the AWC-ASM causes the announcement system to provide the "Ask about survey" whisper. If the speech-related event notification does not indicate detection of the survey context, then the next test in operation 920 determines whether any of the detected keywords pertain to the free shipping context. If so, then the process flow continues to operation 925 where the AWC-ASM causes the announcement system to provide the "free shipping" whisper.

If the speech-related event notification does not indicate the free shipping context, then the detected keywords must pertain to the shipping mistake context in operation 930 and the AWC-ASM causes the announcement system to provide the "ask supervisor" whisper in operation 935.

Finally, if the speech-related event notification is none of these, then a suitable error process is invoked in operation 940. Presumably, the AWC-ASM is configured to process any of the possible speech-related event notifications that it is expected to receive, but the error process allows processing of an unexpected speech-related event notification, which may be due to, e.g., an error by the event handler incorrectly forwarding the event notification.

Once the whisper is provided in each of the contexts, the process loops back to operation 905 for processing any subsequent received speech-related event notifications. For example, it is possible that all three contexts could be encountered during a given call.

As can be seen, if additional contexts are defined, then additional tests may be added to determine the appropriate context with the result of providing the appropriate whisper for that context. The process may continuously loop to examine speech-related contexts as they are provided by the event handler.

In other embodiments, the process may not loop. For example, the process may only detect whether the survey context has occurred, and this may result in only one whisper being provided to the agent at the end of the call. After the whisper is provided, the process may end, and no further whispers are provided. It is also possible, that three separate ASMs could be defined, one which processes one of the three contexts described above. Other variations are possible as to how the ASMs could be structured for handling various contexts in a call.

Coaching Using the Whisper Conference Bridge

The above embodiments relied upon the provision of a pre-recorded or machine generated whisper to the agent. These whispers could be verbal or non-verbal. Further, these could originate from a separate system or one that is integrated into the SAS. In other embodiments, both could exist, and used for providing different whispers. That is, the AWC-ASM may control a machine generated whisper and a recorded announcement. These could be provided by a combination of integrated and distinct capabilities relative to the SAS.

In another embodiment, the whisper could be provided by a human, which reflects the embodiment of bridging on a supervisor or coaching mentor onto the call. This involves the use of another form of whisper bridge, the whisper conference bridge. The whisper conference bridge allows the coach the ability to provide audio to the agent. Obviously, the "whisper" in this case is not prerecorded, nor necessarily limited to short phrases. However, unlike the announcement system, the coach does needs the ability to hear the call. This requires a different whisper bridge than those discussed earlier, since no audio of the call was provided to the announcement system. Recall that the announcement system relied upon a command from the SAS as to what announcement to provide to the agent. In this case, the SAS does not indicate to the coach what whisper should be stated to the agent. However, the SAS may provide an indication of the context to the coach. This could be in the form of a whisper to the coach at the beginning of bridging on the coach or via a visual message to the coach's computer.

Figure 10A:
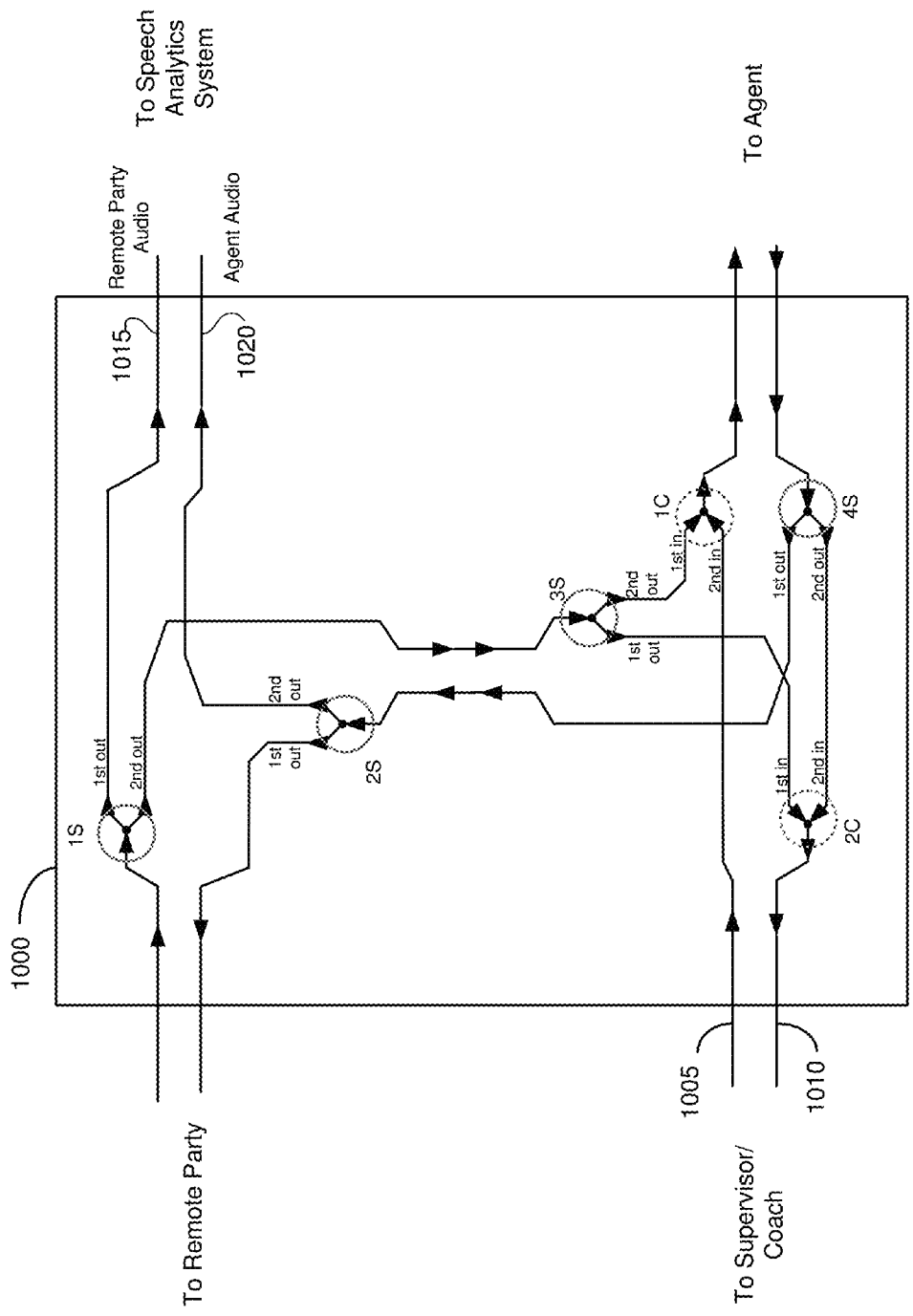
FIGS. 10A-10B illustrates various embodiments of a whisper conference bridge that can be used for bridging on a supervisor for providing the whisper to the agent.

One embodiment of a whisper conference bridge is shown in FIG. 10A. The whisper conference bridge 1000 has four ports. One port is for the remote party (and involves an incoming and outgoing voice channel), one port is for the agent (and also involves an incoming and outgoing voice channel), another port is for the coach (and also involves an incoming and outgoing voice channel), and the last port is for the SAS (and involves two outgoing voice channels).

The coach is required to hear the audio from the remote party and provide audio to the agent. Thus, the audio 1005 from the coach is provided to the $2^{nd}$ in-1C where is it provided only to the agent, but not to the remote party. Thus, the coach can provide guidance to the agent without the remote party hearing what is being said. Further, the coach receives audio 1010 from both the agent and the remote party, as can be traced via 1S, 3S, and 2C for audio from the remote party, and via 4S and 2C for audio from the agent.

The SAS continues to receive audio 1015 from the remote party on a distinct and separate voice channel from audio 1020 from the agent.

The SAS can invoke the whisper conference bridge in the call handler by sending a signaling message over a signaling link from the AWC-ASM to the call handler specifying the address of the coach to be added to the whisper conference bridge.

In some embodiments, the AWC-ASM may cause a whisper to be first provided to the agent followed by a bridging on a supervisor or coach. For example, building upon the aforementioned illustration involving a shipping mistake context, the SAS could provide the agent with a "ask supervisor" whisper, followed by bridging on the agent's supervisor with a whisper conference bridge. A further tone could be provided when the supervisor is connected. In this manner, the agent is aware of the bridging on of the supervisor.

Figure 10B:
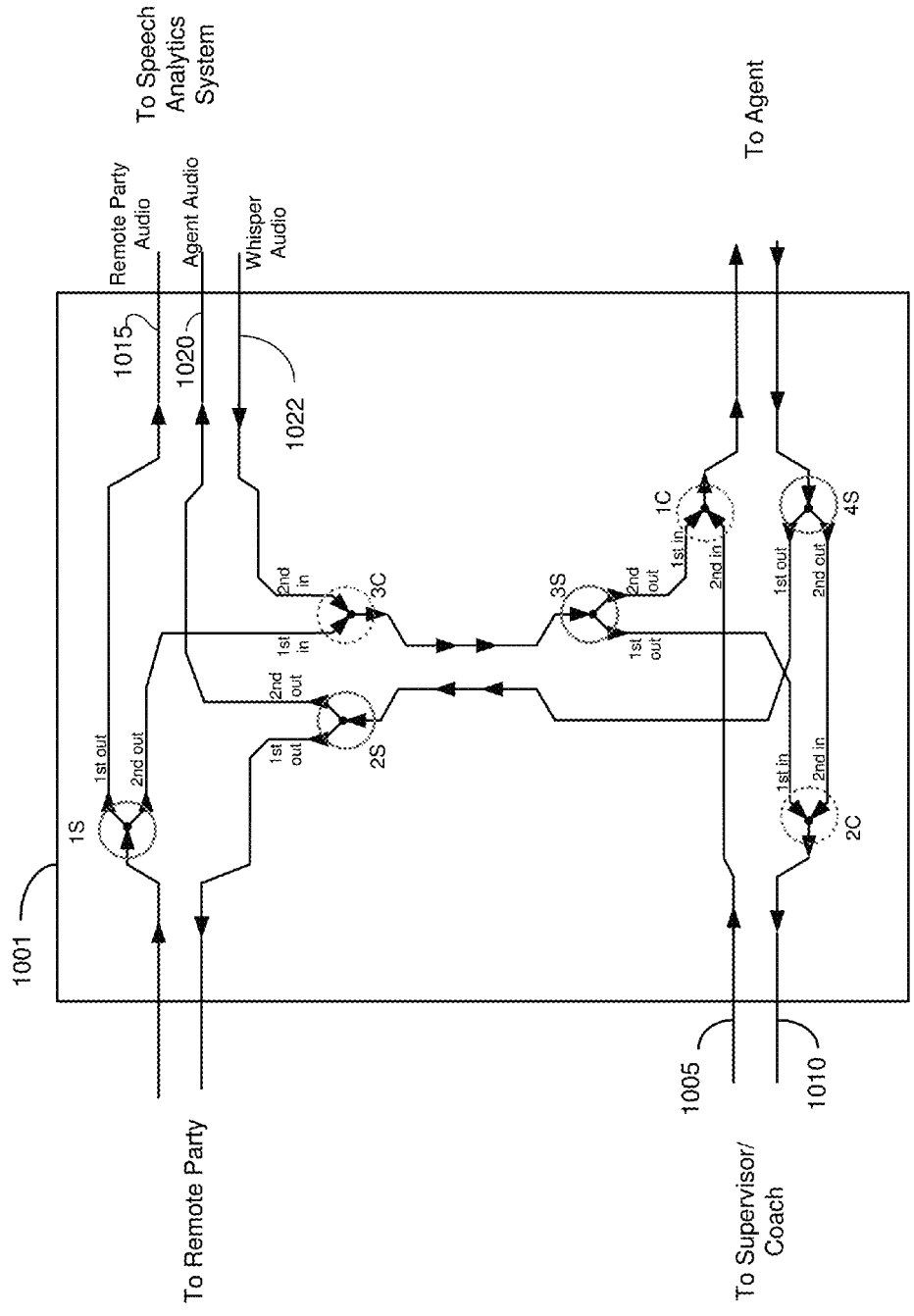

For this embodiment, a slightly different whisper bridge architecture may be required. This is shown in FIG. 10B, which combines aspects of FIG. 5 and FIG. 10A. In this embodiment, the whisper bridge 1001 includes an audio channel 1022 from the SAS similar to that shown in FIG. 5. This allows the SAS to provide the whisper to the agent. In addition, the other components, such as 3S, 2C, 1C, and 4S from FIG. 10A allow the agent to hear the supervisor/coach, and allow the supervisor/coach to hear the call on channel 1010, but the remote party does not hear the supervisor/coach. The coach can provide audio on channel 1005, but only to the agent, not to the remote party. Similar to FIG. 10A, in FIG. 10B the SAS still receives audio from the remote party on channel 1015 and the agent on channel 1020, In one embodiment, the bridge shown in FIG. 5 may be initially used to allow the SAS to provide the whisper, and once the AWC-ASM then invokes the whisper conference bridge in the call handler, the bridge structure may be modified to that shown in FIG. 10B. In other embodiments, the bridge structure in FIG. 10B may be initially used, and the AWC-ASM merely instructs the call handler to connect the indicated supervisor/coach to the call. Recall that in various embodiments that the bridge may be incorporated into the call handler or located in an external system. Any of these approaches incorporates the principles and concepts disclosed herein for allowing the agent to hear verbal coaching from a supervisor without the remote party hearing.

Other Embodiments

As shown in FIG. 1, the AWC-ASM controls the provision of the whisper to the agent. More specifically, the AWC-ASM provides the appropriate signaling to the announcement system causing the announcement system providing the audio to the whisper bridge. The signaling provided by the AWC-ASM can control various aspects in addition to selecting the audio file to be played. A variety of signaling protocols and/or formats can be used for the signaling information.

In one embodiment, the AWC-ASM may indicate information that causes an audio or visual AAI to be provided to the agent. Thus, the announcement system could provide visual in addition to aural information. The AWC-ASM may indicate information specifying the form (e.g., visual or aural) and/or contents. In some embodiments, the announcement system may have an integrated text-to-speech capability. Thus, the AWC-ASM could indicate the AAI content and the form to be provided, e.g., "PLAY ("Ask Supervisor", audio)" for providing a whisper indicating "Ask Supervisor" or "DISPLAY ("Ask Supervisor", text_box)" for providing a pop-up display window indicating the text "Ask Supervisor." In other embodiments, the information could indicate a filename, which by its structure defines whether the information is visual or audio in nature, such as "PROVIDE (file #53)" where file #53 is an WAV file format.

In other embodiments, the AWC-ASM may also provide parameters in the signaling that indicate a speed of playback for audio files or text-to-speech generated whispers. The speed could be indicated as a factor or percentage from a normal speed. This causes the whisper to have a shorter duration, though it cannot be so fast so as to be unintelligible to the agent.

In other embodiments, the AWC-ASM may also include a volume indicator associated with the providing a whisper. This again could be indicated as a relative volume level or an absolute volume control.

In other embodiments, the AWC-ASM may provide the aural and visual AAI to the agent simultaneously. For example, a first reminder to the agent may be provided via text, and if no agent response is detected, a second reminder may be provided that provides a warning tone along with another text reminder simultaneously or contemporaneously (e.g., such that the agent perceives these two forms of AAI are closely related to each other). This can function to provide an indication to the agent to review their display screen should the agent not be paying attention to the screen. No doubt those skilled in the art will be able to utilize the concepts and technologies disclosed herein to construct other variations to fulfill similar service capabilities.

Exemplary Computer Processing Device

Figure 11:
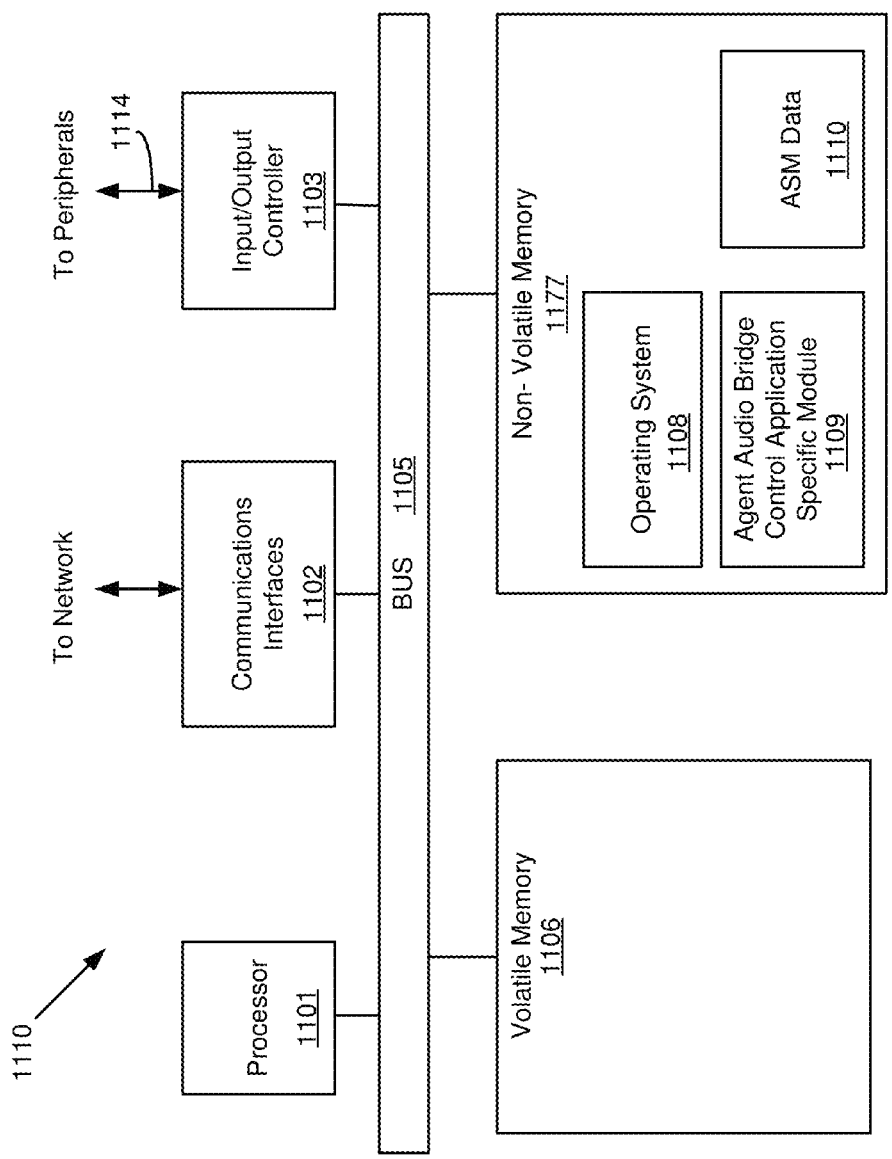
FIG. 11 illustrates an embodiment of a processing device for practicing various technologies and concepts disclosed herein.

FIG. 11 is an exemplary schematic diagram of a computer processing system that may be used in embodiments to practice the technologies disclosed herein. In general, the term "computer processing system" may be exemplified by, for example, but without limitation: a personal computer, server, desktop computer, tablets, smart phones, notebooks, laptops, distributed systems, servers, blades, gateways, switches, and the like, as well as any combination of devices or entities adapted to perform the functions described herein.

The system 1100 may apply to the system executing any of the above modules, including the call handler 110, speech analytics module 120, the event handler module 150, and/or the AWC-ASM module 165, although only the AWC-ASM module is shown in FIG. 11. FIG. 11 could also represent the system of the agent's computer, which displays the status indications to the agent. Further, although FIG. 11 shows only the AWC-ASM module, other modules may be present in the system of FIG. 11, either by integrating their functions into a single module or as separate modules in the system.

As shown in FIG. 11, the processing system 1100 may include one or more processors 1101 that may communicate with other elements within the processing system 1100 via a bus 1105. The processor 1101 may be implemented as one or more complex programmable logic devices ("CPLD"), microprocessor, integrated circuit ("IC") based microprocessor, a von-Neumann architecture-based digital computer, multi-core processors, digital signal processors ("DSP"), system-on-a-chip ("SOC"), co-processing entities, application-specific integrated circuits ("ASIC"), field programmable gate arrays ("FPGA"), programmable logic arrays ("PLA"), hardware accelerators, other circuitry, or the like.

In one embodiment, the processing system 1100 may also include one or more communications interfaces 1102 for communicating data via a data network, such as a local network, with various external devices. In various embodiments, communication may be via wired, optical, or wireless networks (or a combination thereof). The communication may use a variety of data transmission protocols, such as fiber distributed data interface (FDDI), Ethernet, asynchronous transfer mode ("ATM"), or frame relay.

The input/output controller 1103 may also communicate with one or more input devices or peripherals using an interface 1104 such as, but not limited to: a keyboard, a mouse, a touch screen/display input, microphone, pointing device, etc. The input/output controller 1103 may also communicate with output devices or peripherals, such as displays, printers, speakers, headsets, banner displays, etc. These may be used, in part, to receive administrator input, such as for configuring the system's operation.

The processor 1101 may be configured to execute instructions stored in volatile memory 1106, non-volatile memory 1107, or other forms of computer readable storage media accessible to the processor 1101. The volatile memory may comprise various types of memory technologies, including, but not limited to: random access memory ("RAM"), dynamic random access memory ("DRAM"), static random access memory ("SRAM"), and other forms well known to those skilled in the art. The non-volatile memory may comprise various technologies, including, but not limited to: storage media such as hard disks, floppy disks, read only memory ("ROM"), programmable read only memory ("PROM"), electrically erasable read only memory ("EPROM"), flash memory, and other forms well known to those skilled in the art.

The non-volatile memory 1107 may store various program code modules and data, which also may be loaded into the volatile memory 1106 at execution time (though not shown as such in FIG. 11). For example, the non-volatile memory 1107 may store one or more modules, such as the AWC-ASM module 1109 that may implement and perform the above-mentioned process flows containing instructions for performing the process and/or functions associated with the technologies disclosed herein, as well as operating system code 1108. The AWC-ASM module 1109 may also manage data such as the call instance data in the ASM data 1110 which may be recorded for in various calls. The data and/or modules in the non-volatile memory may be copied in the volatile memory 1106 at run time. The volatile memory 1106 and/or non-volatile memory 1107 may be used to store other information including, but not limited to: records, applications, programs, scripts, source code, object code, byte code, compiled code, interpreted code, machine code, executable instructions, or the like. These may be executed or processed by, for example, the processor 1101 and may form a part of, or may interact with, the AWC-ASM module 1109.

The technologies described herein may be implemented in various ways, including as computer program products comprising memory storing instructions causing a processor to perform the operations associated with the above technologies. The computer program product may comprise a non-transitory, tangible computer readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms). The computer readable storage media includes all the above tangible identified computer readable media (including volatile and non-volatile media), but does not encompass a transitory, propagating signal, photon-based storage media, nor does it encompass a non-tangible computer readable medium. Non-volatile computer readable storage medium may specifically comprise: a floppy disk, flexible disk, hard disk, magnetic tape, compact disc read only memory ("CD-ROM"), compact disc compact disc-rewritable ("CD-RW"), digital versatile disc ("DVD"), Blu-ray™ disc ("BD"), any other non-transitory optical medium, and/or the like. Non-volatile computer readable storage medium may also comprise read-only memory ("ROM"), programmable read-only memory ("PROM"), erasable programmable read-only memory ("EPROM"), electrically erasable programmable read-only memory ("EEPROM"), flash memory, and/or other technologies known to those skilled in the art.

The examples for illustrating the concepts and the technologies herein have focused on agents in a contact center, but could be easily applied to other types of applications. Further, those skilled in the art will recognize that in light of this disclosure, many alternative embodiments and applications could be designed taking into account the concepts and technologies disclosed herein.

The invention claimed is:

1. A non-transitory computer readable medium storing instructions that when executed cause a processor to:
  receive a call-related event notification associated with a call established between an agent and a remote party, the call-related event notification indicating a call identifier identifying the call;
  receive a speech-related event notification indicating the call identifier, the speech-related event notification reflecting detection of a keyword in speech in the call;
  ascertain a whisper announcement to be provided to the agent in response to the speech-related event notification;
  cause a message to be transmitted to an announcement system indicating the whisper announcement to be provided by the announcement system to a phone device used by the agent; and
  provide the whisper announcement to a whisper bridge,
    wherein the whisper announcement is provided to the phone device used by the agent,
    wherein the whisper bridge ensures the remote party does not hear the whisper announcement, and
    wherein audio from the remote party is temporarily muted to the agent when the whisper announcement is provided to the phone device.

2. The non-transitory computer readable medium of claim 1, wherein the message indicating the whisper announcement to be provided to the phone device indicates a particular audio file storing aural agent assistance information.

3. The non-transitory computer readable medium of claim 1, wherein the instructions further cause the processor to:
  start a timer after causing the message to be transmitted to the announcement system; and
  process a second speech-related event notification indicating the call identifier, wherein the second speech-related event notification indicates a second keyword detected in speech uttered by the agent during the call prior to expiry of the timer.

4. The non-transitory computer readable medium of claim 3, wherein the instructions further cause the processor to:
  cause the announcement system to provide a second whisper announcement to the agent.

5. The non-transitory computer readable medium of claim 3, wherein the instructions further cause the processor to:
  modify a call instance structure to reflect causing the whisper announcement to be provided to the agent; and store at least a portion of data associated with the call instance structure in a file in response to receiving a call-related event notification indicating termination of the call.

6. The non-transitory computer readable medium of claim 1, wherein the instructions further cause the processor to:
cause visual agent assistance information related to the call to be displayed on a computer used by the agent.

7. A non-transitory computer readable medium storing instructions that when executed cause a processor to:
receive a speech-related event notification indicating a call identifier of a call between an agent and a remote party, wherein the speech-related event notification reflects detection of a keyword in speech on the call;
cause visual agent assistance information to be displayed on a computer used by the agent in response to receiving the speech-related event notification;
cause aural agent assistance information comprising a whisper announcement to be provided to the agent in response to receiving the speech-related event notification; and
cause the whisper announcement to be provided to a phone device used by the agent by providing the whisper announcement to a whisper bridge, wherein the agent hears the whisper announcement and the remote party does not hear the whisper announcement, and wherein the whisper bridge mutes audio from the remote party to the agent when the whisper announcement is provided to the agent.

8. The non-transitory computer readable medium of claim 7, wherein the whisper announcement is provided by a text-to-speech subsystem to a whisper bridge.

9. The non-transitory computer readable medium of claim 7, wherein the aural agent assistance information further comprises a non-verbal sound.

10. The non-transitory computer readable medium of claim 7, wherein the instructions further cause the processor to:
start a timer after causing the whisper announcement to be provided to the phone device used by the agent; and
process a second speech-related event notification indicating the call identifier, wherein the second speech-related event notification indicates a second keyword detected in speech uttered by the agent during the call prior to expiry of the timer.

11. The non-transitory computer readable medium of claim 10, wherein the instructions further cause the processor to:
cause the announcement system to provide a second whisper announcement to the agent after processing the second speech-related event notification.

12. A system for providing a whisper announcement to an agent during a call involving a remote party, the system comprising:
a call handler configured to:
receive a whisper announcement to be provided to the agent, wherein the whisper announcement is provided to a telephone device used by the agent but is not provided to the remote party;
a speech analytics module in a speech analytics system configured to:
detect speech comprising a keyword during the call;
select the whisper announcement from among a plurality of announcements that should be provided to the agent during the call based on the keyword detected during the call; and
provide a message identifying the whisper announcement to be provided to the agent on the call; and
an announcement component configured to:
receive the message identifying the whisper announcement; and
provide the whisper announcement to a whisper bridge in the call handler, wherein the whisper bridge is configured to:
receive the whisper announcement;
ensure the agent hears the whisper announcement but the remote party does not hear the whisper announcement; and
wherein the whisper bridge mutes audio from the remote party to the agent when the whisper announcement is provided to the agent.

13. The system of claim 12, wherein the announcement component originates the whisper announcement via text-to-speech using a whisper bridge.

14. The system of claim 12, wherein the call handler is configured to cause agent assistance information comprising an icon to be displayed on a computer used by the agent in response to the speech analytics module detecting speech comprising the keyword during the call.

15. The system of claim 12, wherein the speech analytics module is further configured to:
start a timer after causing the whisper announcement to be provided to the phone device used by the agent; and
process a second speech-related event notification indicating the call identifier, wherein the second speech-related event notification indicates a second keyword detected in speech uttered by the agent during the call prior to expiry of the timer.

16. The system of claim 12, wherein the speech analytics module is further configured to:
cause the announcement system to provide a second whisper announcement to the agent.

* * * * *